US008125474B2

(12) United States Patent
Kunimori

(10) Patent No.: US 8,125,474 B2
(45) Date of Patent: Feb. 28, 2012

(54) DISPLAY DEVICE

(75) Inventor: Takashi Kunimori, Tottori (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 12/396,620

(22) Filed: Mar. 3, 2009

(65) Prior Publication Data

US 2009/0237382 A1 Sep. 24, 2009

(30) Foreign Application Priority Data

Mar. 19, 2008 (JP) ................................. 2008-070789

(51) Int. Cl.
*G06F 3/038* (2006.01)

(52) U.S. Cl. ......................................... 345/207; 345/87

(58) Field of Classification Search ................... 345/207
See application file for complete search history.

(56) References Cited

U.S. PATENT DOCUMENTS

| | | | | |
|---|---|---|---|---|
| 7,595,795 | B2 * | 9/2009 | Shin et al. | 345/207 |
| 7,936,346 | B2 * | 5/2011 | Kunimori et al. | 345/207 |
| 2007/0091055 | A1 * | 4/2007 | Sakuda | 345/102 |

FOREIGN PATENT DOCUMENTS

| | | |
|---|---|---|
| JP | 09-232620 | 9/1997 |
| JP | 2006-029832 | 2/2006 |
| JP | 2007-140106 | 6/2007 |
| JP | 2007-279100 | 10/2007 |

* cited by examiner

*Primary Examiner* — Jason Olson
(74) *Attorney, Agent, or Firm* — K&L Gates LLP

(57) ABSTRACT

A display device includes: first and second photosensors; a reader; a light detector outputting the light amount detected by the photosensors; a first circuit outputting a first signal based on incident light entering the first photosensor; and a second circuit outputting a second signal based on dimmed incident light entering the second photosensor. The reader includes: a coefficient calculator calculating a first measurement ratio of the first signal to the second signal, and a power correction coefficient; a rate calculator deriving modified power coefficients from the power correction coefficient, calculating a second measurement ratio of the power-corrected first and second signals, and calculating a slope correction coefficient; and an output unit deriving modified proportional coefficients from the slope correction coefficient, and correcting the power-corrected first and second signals using the modified proportional coefficients to yield outputted initial light amount signals.

8 Claims, 13 Drawing Sheets

DISPLAY DEVICE

BACKGROUND

1. Technical Field

The invention relates to a display device and, more particularly, to a display device that includes a light amount detecting device having a sensitivity correction function in consideration of degradation of a photosensor and may be manufactured in a simple process.

2. Related Art

An known existing light amount detection circuit utilizes the relationship that a leakage current from a thin film transistor is proportional to the amount of light received, makes a voltage detecting capacitor charge or discharge electric charge by the leakage current, and then monitors a voltage variation between both ends of the capacitor to thereby detect the amount of light (for example, see JP-A-2006-29832). Incidentally, it is generally known that the leakage current from the thin film transistor is proportional to the amount of light received; however, the sensitivity, which is a leakage current value against the amount of light received, decreases due to light exposure. Thus, in the photodetection circuit described in JP-A-2006-29832, because of the decrease in sensitivity, the accuracy of light amount detection decreases.

In order to prevent such a decrease in detection accuracy, a known photoelectric conversion element modifies a method of producing a thin film transistor to improve the antidegradation property (for example, see JP-A-9-232620).

However, the photoelectric conversion element described in JP-A-9-232620 requires a special manufacturing condition, so manufacturing cost problematically increases. Specifically, when a photosensor is provided inside a display device that uses a thin film transistor or when a display device and a photosensor are manufactured by the same equipment, it is impossible to manufacture the photosensor together with a driving transistor of the display device. Thus, it is necessary to add a manufacturing process or set a complex condition in a manufacturing equipment.

SUMMARY

An advantage of some aspects of the invention is that it provides a display device that includes a light amount detecting device that has a sensitivity correction function and may be manufactured in a simple process.

An aspect of the invention provides a display device. The display device includes: a substrate; a display area provided on the substrate and includes a switching element in correspondence with each pixel; a photodetection unit having first and second photosensors; a photosensor reader unit; a light amount detecting device that outputs the amount of light detected by the photodetection unit as a light amount signal; a first photodetection circuit that outputs a first output signal based on incident light that enters the first photosensor to the photosensor reader unit; and a second photodetection circuit that outputs a second output signal to the photosensor reader unit based on dimmed incident light, which is dimmed through a light dimming unit as compared with the light that enters the first photosensor and which enters the second photosensor. The photosensor reader unit includes: a photodegradation coefficient calculation unit that calculates a first measurement ratio, which is a ratio of the first output signal to the second output signal, and then calculates a photodegradation power correction coefficient, which is a ratio of the first measurement ratio to an initial ratio that is an initial first measurement ratio measured beforehand; a photodegradation rate calculation unit that derives modified power coefficients on the basis of the photodegradation power correction coefficient, calculates a second measurement ratio, which is a ratio of the power-corrected first and second output signals, using the modified power coefficients, and then calculates a photodegradation slope correction coefficient, which is a ratio of the second measurement ratio to the initial ratio; and an optical signal output unit that derives modified proportional coefficients on the basis of the photodegradation slope correction coefficient, corrects the power-corrected first and second output signals using the modified proportional coefficients so as to be initial light amount signals and then outputs the initial light amount signals.

According to the aspect of the invention, it is possible to accurately calculate the initial first or second output signal from the relationship among the first and second output signals, the initial ratio prepared beforehand, the photodegradation power correction coefficient K, the photodegradation slope correction coefficient K", and the modified proportional coefficients. Thus, it is possible to implement a display device having the function of correcting the sensitivity without adding any modification to the structure of the photosensor. In addition, the manufacturing process for the photosensor may be integrated with the manufacturing process for the driving transistor of the display device. Thus, it is possible to manufacture the photosensor in a simple process. Hence, manufacturing cost may be reduced.

The photodegradation rate calculation unit may include a look-up table that associates the photodegradation power correction coefficient with an initial power coefficient correction amount measured beforehand, and the modified power coefficients may be calculated on the basis of the power coefficient correction amount.

If the modified power coefficients are expressed as a function of the photodegradation power correction coefficient, when the function becomes a complex expression, the circuit size increases. This causes an increase in manufacturing cost and, in addition, increases power consumption. In place of such a function, the photodegradation rate calculation unit includes the look-up table to eliminate the necessity of a large-size circuit. Thus, it is possible to provide a display device that suppresses manufacturing cost and that reduces power consumption.

The photodegradation rate calculation unit, when the photodegradation power correction coefficient is not included in the look-up table, may derive the modified power coefficients through interpolation calculation using the initial power coefficient correction amount measured beforehand in the look-up table.

Thus, it is possible to derive modified power coefficients corresponding to a given photodegradation power correction coefficient that is not included in the look-up table. Hence, it is possible to provide a display device that is able to suppress the data size by reducing the look-up table.

The optical signal output unit may include a look-up table that associates the photodegradation slope correction coefficient with an initial proportional coefficient correction amount measured beforehand, and modified proportional coefficients may be calculated on the basis of the proportional coefficient correction amount.

If the initial proportional coefficient correction amount is expressed as a function of the photodegradation slope correction coefficient, when the function becomes a complex expression, the circuit size increases. This causes an increase in manufacturing cost and, in addition, increases power consumption. In place of such a function, the optical signal output unit includes the look-up table to eliminate the necessity of a large-size circuit. Thus, it is possible to provide a display device that suppresses manufacturing cost and that reduces power consumption.

The optical signal output unit, when the photodegradation slope correction coefficient is not included in the look-up table, may derive the modified proportional coefficients through interpolation calculation using the initial proportional coefficient correction amount measured beforehand in the look-up table.

Thus, it is possible to derive the initial proportional coefficient correction amount measured beforehand, corresponding to an arbitrary photodegradation slope correction coefficient that is not included in the look-up table. Hence, it is possible to provide a display device that is able to suppress the data size by reducing the look-up table.

The first and second photosensors may be thin film transistors, and each may include a capacitor that charges a voltage applied between both ends of the thin film transistor.

By so doing, the potentials charged in the capacitors vary in accordance with the amount of incident light that enters the first photosensor and the amount of dimmed incident light that enters the second photosensor. Thus, it is possible to provide a display device that outputs the potentials to the photosensor reader unit as first and second output signals.

The photodegradation coefficient calculation unit may logarithmically transform the first and second output signals to calculate the photodegradation power correction coefficient, the photodegradation rate calculation unit may acquire logarithms of the modified power coefficients on the basis of the logarithmic photodegradation power correction coefficient and calculate a logarithm of the photodegradation slope correction coefficient, and the optical signal output unit may derive logarithmic modified proportional coefficients on the basis of the logarithmic photodegradation slope correction coefficient, correct the logarithmic first and second output signals to be logarithmic initial light amount signals using the logarithmic modified proportional coefficients, inverse-logarithmically transform the corrected logarithmic initial light amount signals, and then output the initial light amount signals.

By so doing, multiplication and division circuits in the photosensor reader unit may be replaced with addition and subtraction circuits. Thus, it is possible to provide a display device that reduce the circuit size and suppresses power consumption. Hence, manufacturing cost may be reduced.

The display area may include an electrooptic material layer.

By so doing, it is possible to detect the incident light amount in the electrooptic material layer by the photosensors. Thus, it is possible to provide a display device that is able to perform image display with the amount of light emission appropriate in accordance with a usage environment.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a display device according to embodiments of the invention will be described with reference to the accompanying drawings. The embodiments just illustrate example embodiments of the invention and are not intended to limit the invention, and may be modified at will within the scope of the technical idea of the invention. In the following drawings, for easy understanding of each structure, the scale, number, and the like, of components in each structure are varied from an actual structure.

First Embodiment

Figure 1:
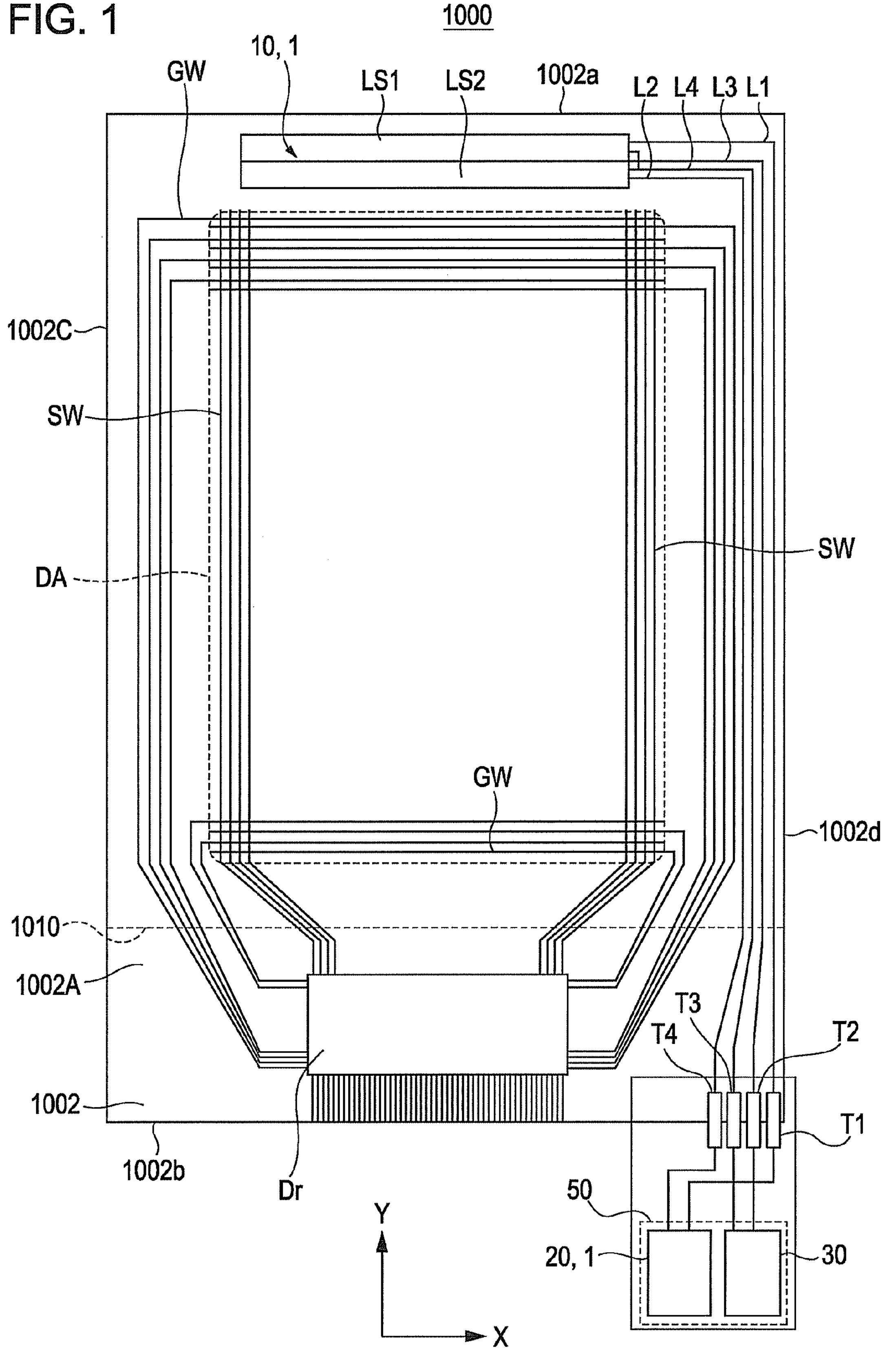
FIG. 1 is a plan view of a transflective liquid crystal display device.
Figure 2:
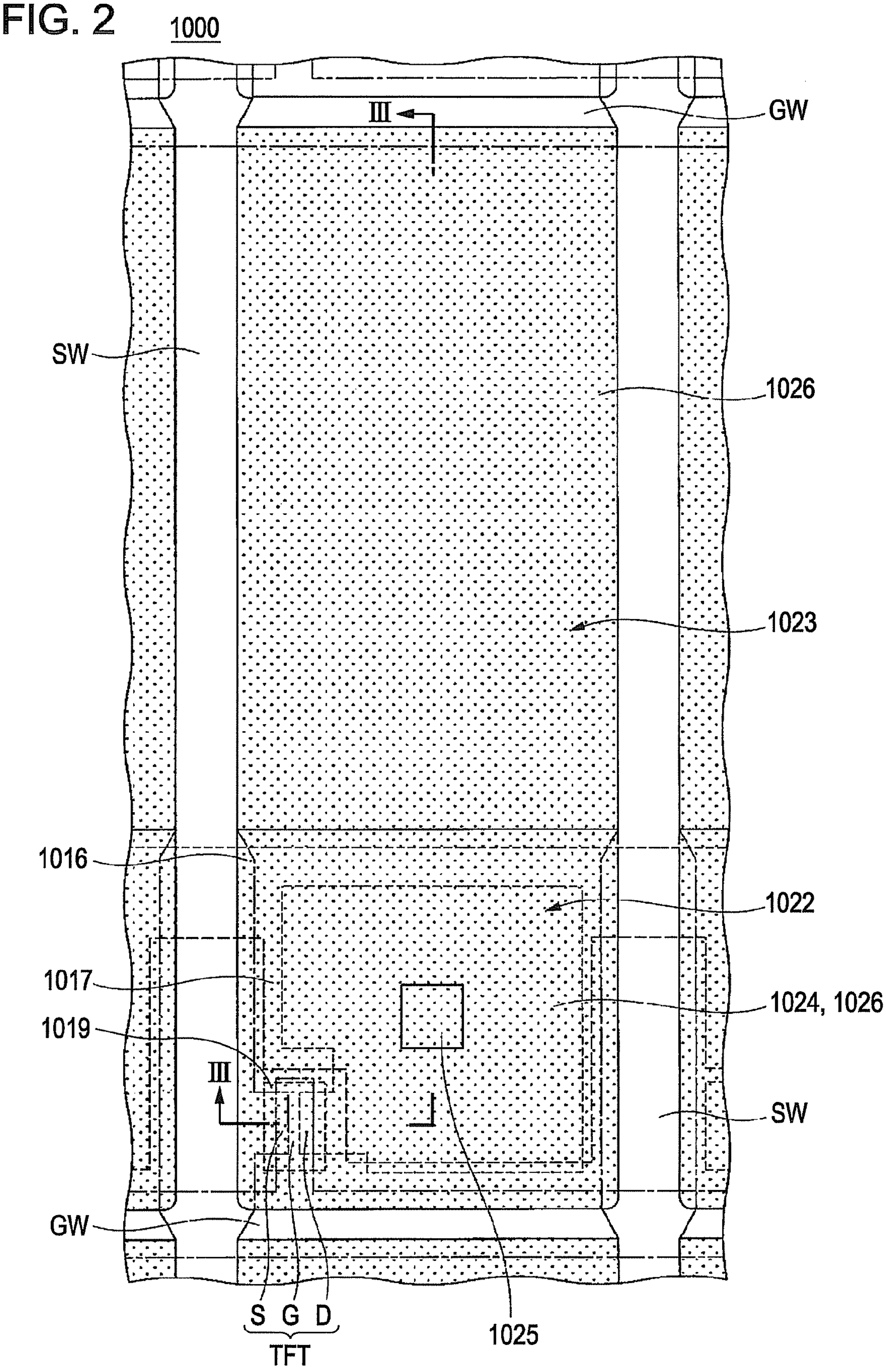
FIG. 2 is a plan view of one pixel on an array substrate.
Figure 3:
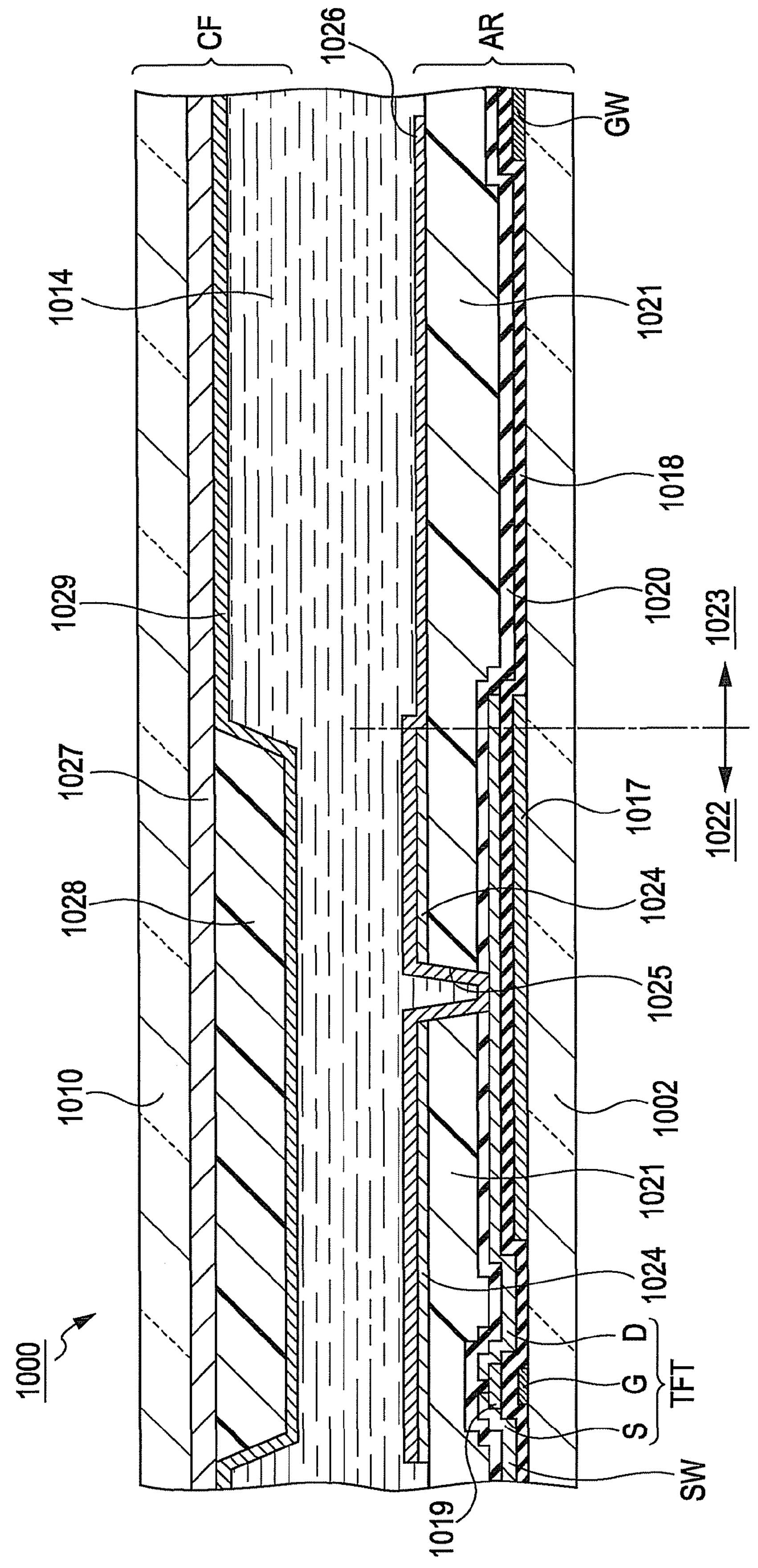
FIG. 3 is a cross-sectional view that is taken along the line III-III in FIG. 2.

FIG. 1 is a schematic plan view of an array substrate in a transflective liquid crystal display device (display device/electro-optical device) according to a first embodiment of the invention. Note that FIG. 1 is shown as viewed through a color filter substrate. FIG. 2 is a plan view of one pixel on the array substrate shown in FIG. 1. FIG. 3 is a cross-sectional view that is taken along the line III-III in FIG. 2.

As shown in FIG. 1, the liquid crystal display device 1000 includes the array substrate AR and the color filter substrate CF, which are arranged so as to face each other. The array substrate AR is formed so that various wires, and the like, are formed on a transparent substrate 1002 made of a rectangular transparent insulating material, such as glass plate. The color filter substrate CF is formed so that various wires, and the like, are formed on a transparent substrate 1010 made of a similar rectangular transparent insulating material. The array substrate AR has a size larger than the color filter substrate CF so as to form an extended portion 1002A having a predetermined area when arranged so as to face the color filter substrate CF. A seal material (not shown) is adhered around these array substrate AR and color filter substrate CF, and a liquid crystal (electrooptic material) 1014 and a spacer (not shown) are enclosed inside.

The array substrate AR has opposite short sides 1002*a* and 1002*b* and opposite long sides 1002*c* and 1002*d*. The extended portion 1002A is formed at one short side 1002*b*. A semiconductor chip Dr for source driver and gate driver is mounted on the extended portion 1002A, and a photodetection unit 10 is arranged at the other short side 1002*a*. In addition, a backlight (not shown) is provided on the back surface of the array substrate AR as an illumination unit. The backlight is controlled by an external control circuit (not shown) on the basis of an output from the photodetection unit 10.

The array substrate AR has a plurality of gate lines GW and a plurality of source lines SW on a surface that faces the color filter substrate CF, that is, a surface that contacts the liquid crystal 1014. The plurality of gate lines GW are arranged at predetermined intervals so as to extend horizontally (X-axis direction) in FIG. 1. The plurality of source lines SW are arranged at predetermined intervals so as to extend vertically (Y-axis direction), and insulated from the gate lines GW. These source lines SW and gate lines GW are wired in a matrix. In each area surrounded by the gate lines GW and the source lines SW that intersect with one another, a TFT (see FIG. 2), which serves as a switching element, and a pixel electrode 1026 (see FIG. 3) are formed. The switching element turns on by a scanning signal from the gate line GW. The pixel electrode 1026 is supplied with an image signal from the source line SW through the switching element.

Each area surrounded by these gate lines GW and source lines SW forms a so-called pixel, and an area that includes a plurality of these pixels is a display area DA. In addition, the switching element, for example, employs a thin film transistor (TFT).

Each gate line GW and each source line SW extend to the outside of the display area DA, that is, to a window-frame area, and are connected to the driver Dr formed of a semiconductor chip such as an LSI. In addition, on the array substrate AR, lead wires $L_1$ to L4 are led from first and second photodetection circuits LS1 and LS2 of the photodetection unit 10 at the one long side 1002*d* and wired to be connected to terminals T1 to T4 that are the contacts with an external control circuit 50. Note that the lead wire L1 constitutes a first source line, the lead wire L2 constitutes a second source line, the lead wire L3 constitutes a drain line, and the lead wire L4 constitutes a gate line.

The external control circuit 50 includes a photosensor reader unit 20 and a potential control circuit 30. The photosensor reader unit 20 is connected to the terminals T1 and T2. The potential control circuit 30 is connected to the terminals T3 and T4. The potential control circuit 30 supplies a reference voltage, a gate voltage, and the like, to the photodetection unit 10, and an output signal is output from the photodetection unit 10 to the photosensor reader unit 20. Then, the backlight (not shown) is controlled by a light amount signal from the photosensor reader unit 20.

In addition, the driver Dr on the transparent substrate 1002 may be replaced with an IC (Integrated Circuit) chip that includes the driver Dr, the photosensor reader unit 20, and the like.

Next, a specific configuration of each pixel will be mainly described with reference to FIG. 2 and FIG. 3. In the display area DA on the transparent substrate 1002 of the array substrate AR, the gate lines GW are formed parallel to one another at equal intervals, and a gate electrode G of each TFT that constitutes the switching element is extended from the gate line GW. In addition, an auxiliary capacitor line 1016 is formed in substantially the middle between the adjacent gate lines GW so as to be parallel to the gate lines GW, and the auxiliary capacitor line 1016 has an auxiliary capacitor electrode 1017 formed to have an area wider than the auxiliary capacitor line 1016.

In addition, a gate insulating film 1018 made of a transparent insulating material, such as silicon nitride or silicon oxide, is formed all over the entire surface of the transparent substrate 1002 so as to cover the gate lines GW, the auxiliary capacitor line 1016, the auxiliary capacitor electrode 1017 and the gate electrode G. Then, a semiconductor layer 1019 made of amorphous silicon, and the like, is formed on the gate electrode G through the gate insulating film 1018. In addition, the plurality of source lines SW are formed on the gate insulating film 1018 so as to intersect with the gate lines GW. A source electrode S of the TFT is extended from the source line SW so as to contact the semiconductor layer 1019. Furthermore, a drain electrode D made of the same material as those of the source line SW and the source electrode S is provided on the gate insulating film 1018 so as to contact the semiconductor layer 1019.

Here, an area surrounded by the gate lines GW and the source lines SW corresponds to one pixel. Then, the TFT, which serves as the switching element, is formed of the gate electrode G, the gate insulating film 1018, the semiconductor layer 1019, the source electrode S, and the drain electrode D. The TFT is formed in each pixel. In this case, an auxiliary capacitor of each pixel is formed by the drain electrode D and the auxiliary capacitor electrode 1017.

A protection insulating film (also called passivation film) 1020 made of, for example, an inorganic insulating material is laminated all over the entire surface of the transparent substrate 1020 so as to cover these source lines SW, TFT, gate insulating film 1018. An interlayer film (also called planarization film) 1021 made of acrylic resin, or the like, containing, for example, a negative photosensitive material is laminated all over the entire surface of the transparent substrate 1002 on the protection insulating film 1020. The surface of the interlayer film 1021 has microscopic asperities (not shown) at a reflection portion 1022 and is flat at a transmission portion 1023.

Then, a reflector 1024 made of, for example, aluminum or aluminum alloy, is formed on the surface of the interlayer film 1021 at the reflection portion 1022 by sputtering. A contact hole 1025 is formed at a portion of the protection insulating film 1020, interlayer film 1021 and reflector 1024, which face the drain electrode D of the TFT.

Furthermore, in each pixel, a pixel electrode 1026 made of, for example, ITO (Indium Tin Oxide) or IZO (Indium Zinc Oxide) is formed on the surface of the reflector 1024, in the contact hole 1025, and on the surface of the interlayer film 1021 of the transmission portion 1023. An alignment layer (not shown) is laminated in a further upper layer with respect to the pixel electrode 1026 so as to cover all the pixels.

In addition, in the color filter substrate CF, a light shielding layer (not shown) is formed on the surface of the transparent substrate 1010 made of a glass substrate, or the like, so as to face the gate lines GW and source lines SW of the array substrate AR, and, in correspondence with each pixel surrounded by the light shielding layer, for example, a color filter layer 1027 formed of red (R), green (G) and blue (B) is provided. Furthermore, a topcoat layer 1028 is formed on the surface of the color filter layer 1027 at a position corresponding to the reflection portion 1022. A common electrode 1029 and an alignment layer (not shown) are laminated on the surface of the topcoat layer 1028 and on the surface of the color filter layer 1027 at a position corresponding to the transmission portion 1023. Note that the color filter layer 1027 may further employ a color filter layer, such as cyan (C), magenta (M), yellow (Y), or the like, in combination, where appropriate, and may not provide a color filter layer for monochrome display.

Then, the thus configured array substrate AR and color filter substrate CF are adhered by the seal material (not shown), and finally the liquid crystal 1014 is enclosed into a space surrounded by both the substrates and the seal material. Thus, the transflective liquid crystal display device 1000 may be obtained. Note that the backlight or a sidelight having a known light source, light guide plate, diffusion sheet, and the like, is arranged below the transparent substrate 1002. In this case, when the reflector 1024 is provided all over the entire lower portion of each pixel electrode 1026, a reflective liquid crystal display panel may be obtained, whereas in the case of a reflective liquid crystal display device that uses the reflective liquid crystal display panel, a frontlight is used in place of the backlight or the sidelight.

Figure 4:
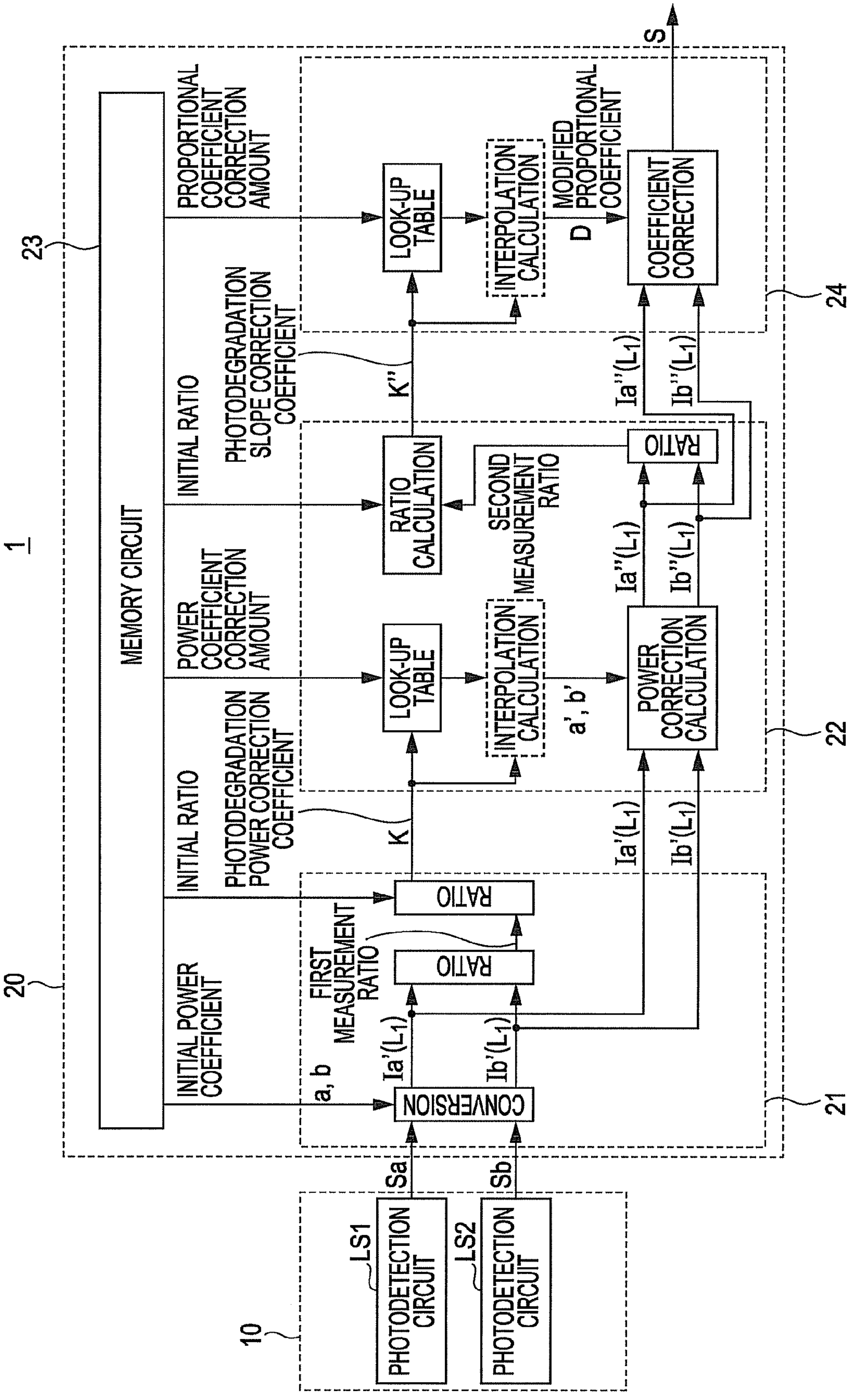
FIG. 4 is a block diagram that shows the configuration of a light amount detecting device.

FIG. 4 is a block diagram that shows the configuration of the light amount detecting device 1 formed of the photodetection unit 10 and the photosensor reader unit 20. The photodetection unit 10 includes a first photodetection circuit LS1 and a second photodetection circuit LS2. A first output signal Sa from the first photodetection circuit LS1 and a second output signal Sb from the second photodetection circuit LS2 are output to the photosensor reader unit 20.

The photosensor reader unit 20 includes a photodegradation coefficient calculation unit 21, a photodegradation rate calculation unit 22, a memory circuit 23 and an optical signal output unit 24.

The photodegradation coefficient calculation unit 21 is connected to the first photodetection circuit LS1, the second photodetection circuit LS2 and the memory circuit 23. The photodegradation coefficient calculation unit 21 reads initial power coefficients a and b stored in the memory circuit 23, and reads the first output signal Sa and the second output signal Sb as a first photoelectric current amount and a second photoelectric current amount, which are leak currents in the photosensor. Then, the photodegradation coefficient calculation unit 21 calculates a first measurement ratio, which is a ratio of the first photoelectric current amount to the second photoelectric current amount, and then calculates a photodegradation power correction coefficient K, which is a ratio of the first measurement ratio to an initial ratio. The initial ratio is a measurement ratio in an initial state and is stored in the memory circuit 23 beforehand. Then, the photodegradation coefficient calculation unit 21 outputs the photodegradation power correction coefficient K and the first photoelectric current amount or second photoelectric current amount to the photodegradation rate calculation unit 22.

The photodegradation rate calculation unit 22 is connected to the photodegradation coefficient calculation unit 21 and the memory circuit 23. Then, the photodegradation rate calculation unit 22 refers to a look-up table that associates a photodegradation power correction coefficient K with a power coefficient correction amount, and acquires modified power coefficients a' and b' corresponding to the photodegradation power correction coefficient K output from the photodegradation coefficient calculation unit 21. Subsequently, the photodegradation rate calculation unit 22 calculates power-corrected first and second output signals on the basis of the modified power coefficients a' and b', calculates a second measurement ratio, which is a ratio of the power-corrected first output signal to the power-corrected second output signal, and then calculates a photodegradation slope correction coefficient K", which is a ratio of the second measurement ratio to the initial ratio. The initial ratio is the ratio in an initial state measured beforehand.

In addition, the optical signal output unit 24 is connected to the photodegradation rate calculation unit 22 and the memory circuit 23. Then, the optical signal output unit 24 refers to a look-up table that associates the photodegradation slope correction coefficient K" from the photodegradation rate calculation unit 22 with a proportional coefficient correction amount to thereby calculate a modified proportional coefficient D, corrects the power-corrected first or second output signal to an initial light amount signal on the basis of the modified proportional coefficient D, and then outputs the initial first photoelectric current amount or the initial second photoelectric current amount as the light amount signal S corresponding to the incident light amount.

Figure 5:
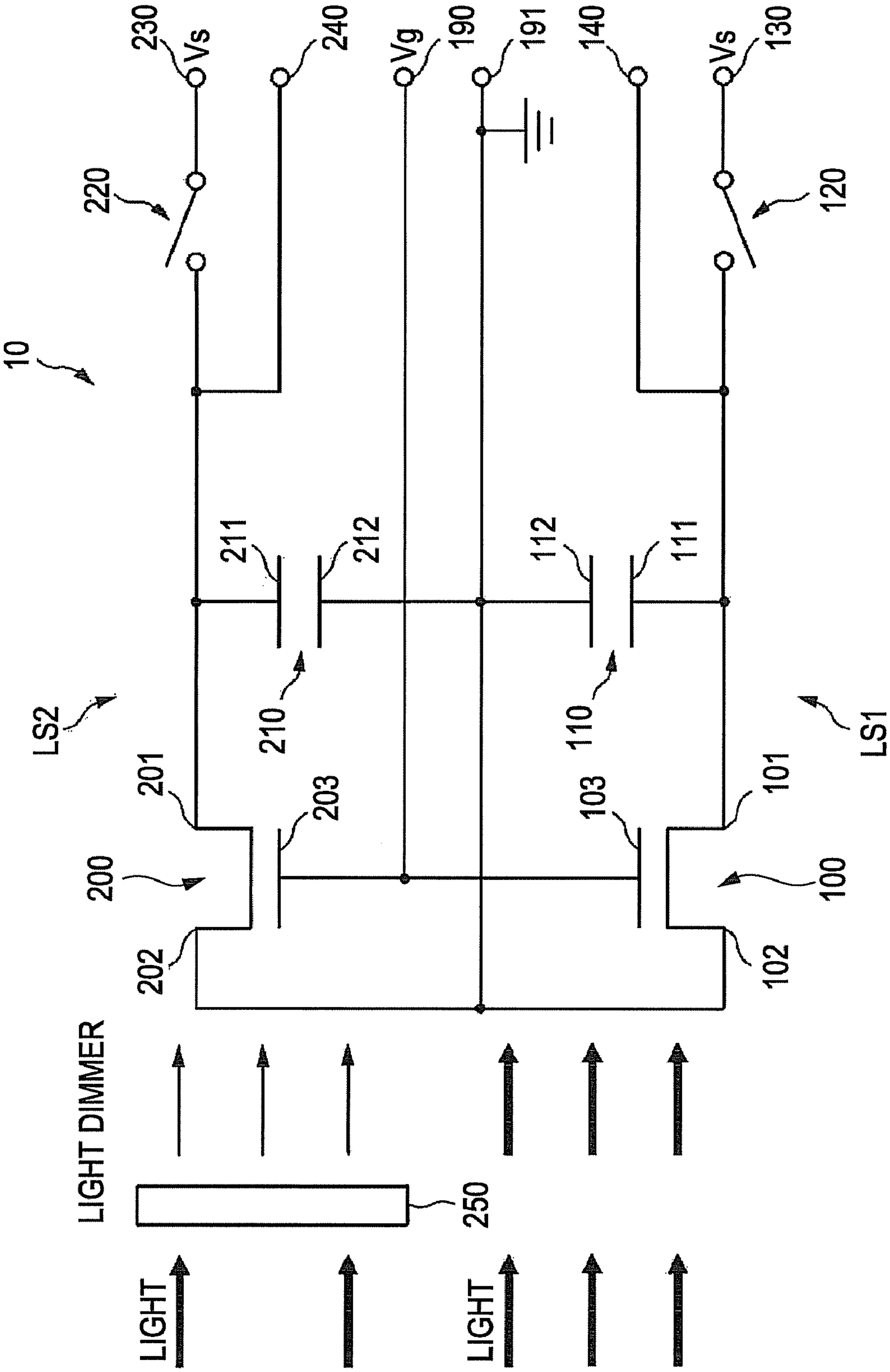
FIG. 5 is a circuit configuration diagram of a first photodetection circuit and second photodetection circuit.

FIG. 5 is a circuit configuration diagram of the photodetection unit 10. The first photodetection circuit LS1 of the photodetection unit 10 includes a thin film transistor (photosensor; hereinafter simply referred to as TFT) 100, a capacitor 110, and a switching element 120. The TFT 100 is connected in parallel with the capacitor 110. That is, a source portion 101 of the TFT 100 is electrically connected to an electrode 111 of the capacitor 110, and a drain portion 102 of the TFT 100 is electrically connected to an electrode 112 of the capacitor 110. The source portion 101 and the electrode 111 are connected to an output terminal 140, and is connected through a switching element 120 to a power supply terminal 130. Then, the output terminal 140 is electrically connected to the terminal T1 through the lead wire L1 shown in FIG. 1.

In addition, the drain portion 102 of the TFT 100 and the electrode 112 of the capacitor 110 are electrically connected to a drain terminal 191. The drain terminal 191 is electrically connected to the terminal T3 through the lead wire L3 shown in FIG. 1. The drain terminal 191 is grounded; however, the drain terminal 191 may be grounded inside the photodetection unit 10 or may be grounded through the terminal T3. Then, a gate portion 103 of the TFT 100 is electrically connected to a gate terminal 190.

The second photodetection circuit LS2 of the photodetection unit 10 includes a thin film transistor (photosensor; hereinafter, simply referred to as TFT) 200, a capacitor 210, a switching element 220 and a color filter (light dimmer) 250. The thin film transistor 200 is connected in parallel with the capacitor 210. That is, a source portion 201 of the TFT 200 is electrically connected to an electrode 211 of the capacitor 210, and a drain portion 202 of the TFT 200 is electrically connected to an electrode 212 of the capacitor 210. The color filter 250 is arranged on the light incident side of the TFT 200, and the TFT 200 detects light that is dimmed by the color filter 250. The source portion 201 and the electrode 211 are connected to an output terminal 240, and is connected through a switching element 220 to a power supply terminal 230. The output terminal 240 is electrically connected to the terminal T2 through the lead wire L2 shown in FIG. 1.

In addition, the drain portion 202 of the TFT 200 and the electrode 112 of the capacitor 210 are electrically connected to the drain terminal 191. The drain terminal 191 is shared with the TFT 100, and is electrically connected to the terminal T3 through the lead wire L3 shown in FIG. 1. Then, a gate portion 203 of the TFT 200 is electrically connected to the gate terminal 190 that is shared with the TFT 100.

The output terminal 240 is electrically connected to the terminal T2 through the lead wire L2 shown in FIG. 1. The drain terminal 191 is electrically connected to the terminal T3 through the lead wire L3 shown in FIG. 1. The gate terminal 190 is electrically connected to the terminal T4 through the lead wire L4 shown in FIG. 1.

Figure 6A:
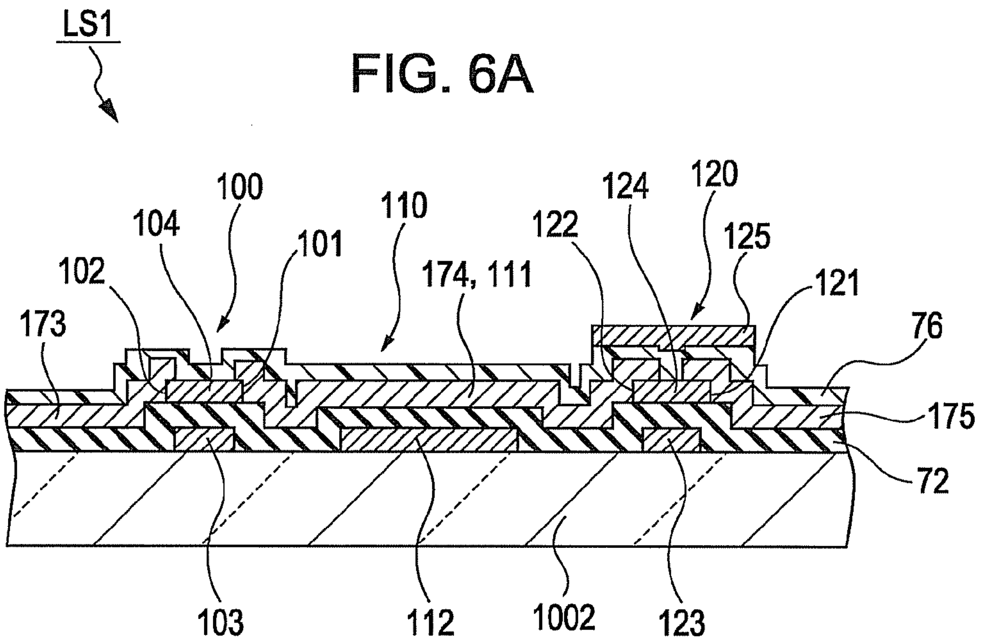
FIG. 6A and FIG. 6B are schematic cross-sectional views of a photodetection unit.
Figure 6B:
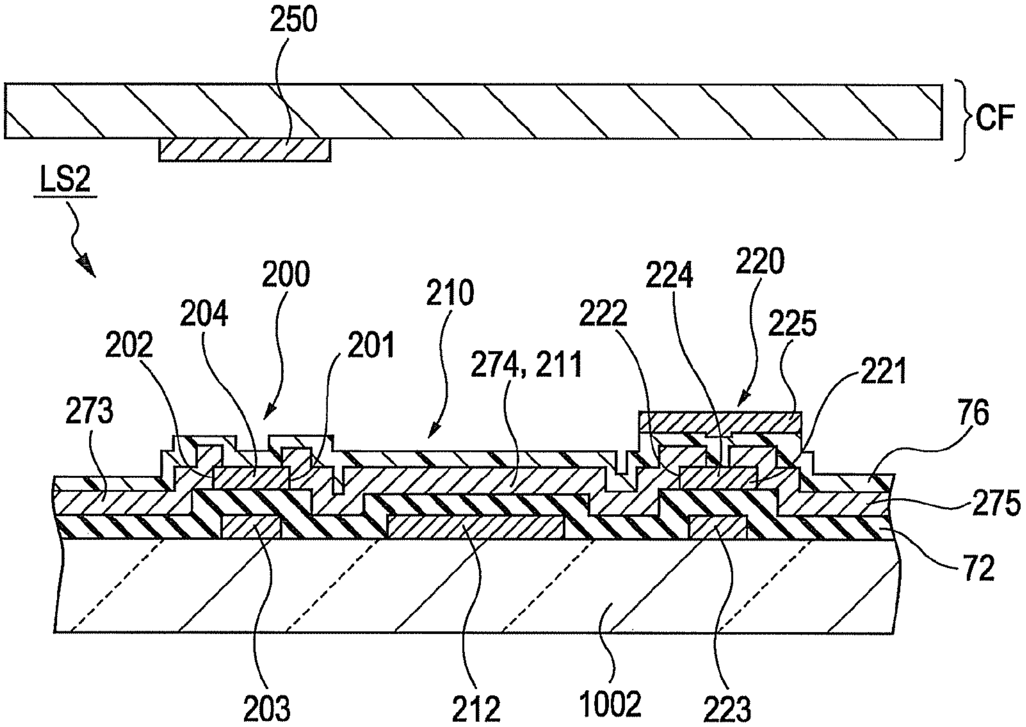

FIG. 6A and FIG. 6B are schematic cross-sectional views of the photodetection unit 10. FIG. 6A shows the first photodetection circuit LS1. FIG. 6B shows the second photodetection circuit LS2. First, the first photodetection circuit LS1 will be described with reference to FIG. 6A. The TFT 100 that constitutes the first photodetection circuit LS1, the capacitor 110 and the switching element 120 are formed on the transparent substrate 1002. The gate portion 103 of the TFT 100, the electrode 112 of the capacitor 110, the gate portion 123 of the thin film transistor, which is the switching element 120, are formed on the transparent substrate 1002. A gate insulating film 72 is laminated so as to cover the gate portion 103, the electrode 112 and the gate portion 123.

On the gate insulating film 72, a semiconductor layer 104 is formed above the gate portion 103, and a semiconductor layer 124 is formed above the gate portion 123. A conductive film 173 connected to the drain portion 102 of the semiconductor layer 104, a conductive film 174 connected to the source portion 101 and the drain portion 122 of the semiconductor layer 124 and a conductive film 175 connected to the source portion 121 are formed on the gate insulating film 72. The conductive film 174 constitutes the electrode 111 of the capacitor 110 in an area above the electrode 112.

The protection insulating film 76 is laminated so as to cover these conductive films 173, 174 and 175. A black matrix 125 is formed on the protection insulating film 76 so as to cover the semiconductor layer 124 of the switching element 120 in plan view.

The first photodetection circuit LS1 is formed on the same substrate with the display area DA, and may be partially manufactured in the same process with the array substrate AR. For example, the gate insulating film 72 of the first photodetection circuit LS1 may be manufactured together with the gate insulating film 1018 of the array substrate AR, the gate insulating film 76 of the first photodetection circuit LS1 together with the gate insulating film 1020 of the array substrate AR, the conductive films 173, 174 and 175 of the first photodetection circuit LS1 together with the source electrode S and drain electrode D of the array substrate AR, and the semiconductor layers 104 and 124 of the first photodetection circuit LS1 together with the semiconductor layer 1019 of the array substrate AR, and the like.

Subsequently, the second photodetection circuit will be described with reference to FIG. 6B. The TFT 200 that constitutes the second photodetection circuit LS2, the capacitor 210, and the switching element 220 are formed on the transparent substrate 1002. The gate portion 203 of the TFT 200, the electrode 212 of the capacitor 210, the gate portion 223 of the switching element 220, which is the thin film transistor, are formed on the transparent substrate 1002. The gate insulating film 72 is laminated so as to cover the gate portion 203, the electrode 212 and the gate portion 223.

On the gate insulating film 72, a semiconductor layer 204 is formed above the gate portion 203, and a semiconductor layer 224 is formed above the gate portion 223. A conductive film 273 connected to the drain portion 202 of the semiconductor layer 204, a conductive film 274 connected to the source portion 201 and the drain portion 222 of the semiconductor layer 224 and a conductive film 275 connected to the source portion 221 are formed on the gate insulating film 72. The conductive film 274 constitutes the electrode 211 of the capacitor 210 in an area above the electrode 212.

The protection insulating film 76 is laminated so as to cover these conductive films 273, 274 and 275. A black matrix 225 is formed on the protection insulating film 76 so as to cover the semiconductor layer 224 of the switching element 220 in plan view. Then, in the TFT 200, the color filter 250 is formed on the protection insulating film 76 The color filter 250 dims incident light that enters the second photodetection circuit LS2 by 1/n (n>1) as compared with that of the first photodetection circuit LS1.

The second photodetection circuit LS2 is formed on the same substrate with the display area DA, and may be partially manufactured in the same process with the array substrate AR. For example, the gate insulating film 72 of the second photodetection circuit LS2 may be manufactured together with the gate insulating film 1018 of the array substrate AR, the gate insulating film 76 of the second photodetection circuit LS2 together with the gate insulating film 1020 of the array substrate AR, the conductive films 273, 274 and 275 of the second photodetection circuit LS2 together with the source electrode S and drain electrode D of the array substrate AR, and the semiconductor layers 204 and 224 of the first photodetection circuit LS2 together with the semiconductor layer 1019 of the array substrate AR, and the like.

The light amount detecting device 1 of the display device 1000 according to the aspects of the invention has the function of correcting sensitivity of the photosensor, which decreases due to photodegradation. Hereinafter, the principle of correcting sensitivity of the photosensor will be described. First, light is irradiated to the photodetection unit 10 of which the capacitors 110 and 120 are charged to predetermined potentials. Then, because leakage current occurs in the TFTs 100 and 200, the potentials of the capacitors 120 and 220 decrease over time. At this time, the potentials of the electrodes 111 and 211 of the capacitors 110 and 210 are output from the photodetection unit 10 as a first signal Sa and a second signal Sb. Then, the photosensor reader unit 20 reads information corresponding to a photoelectric current from signals of the potentials output from the photodetection unit 10, executes correction on the information, and then outputs the corrected information as a light amount signal. Thus, a calculation method using the photoelectric current will be described below, and the photoelectric current used in calculation may be replaced with a value read by the photosensor reader unit 20.

For correcting the sensitivity of the photosensor, first, a photodegradation power correction coefficient K is calculated. The photodegradation power correction coefficient K is a ratio of a first measurement ratio to an initial measurement ratio. The first measurement ratio is a ratio of a first photoelectric current in consideration of an initial power coefficient a of a measured (degraded) first photodetection circuit LS1 to a second photoelectric current in consideration of an initial power coefficient b of the second photodetection circuit LS2. Next, modified power coefficients a' and b' are calculated on the basis of the calculated photodegradation power correction coefficient K. Then, using the modified power coefficients a' and b', a second measurement ratio, which is a ratio of the power-corrected first output signal to the power-corrected second output signal. After that, a photodegradation slope correction coefficient K", which is a ratio of the second measurement ratio to the initial ratio, is calculated. Thereafter, modified proportional coefficients are derived on the basis of the photodegradation slope correction coefficient K", and the power-corrected first and second output signals are corrected to be the initial light amount signal using the modified proportional coefficients and output as the light amount signals S of incident light.

Figure 7:
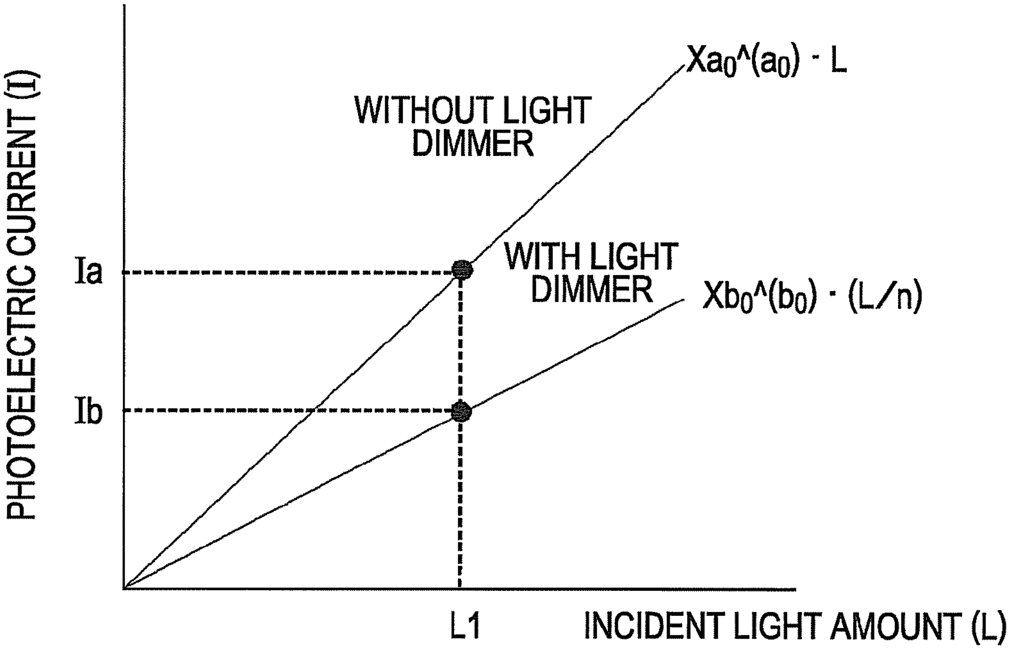
FIG. 7 is a view that shows a photoelectric current as a function of an incident light amount.

Here, a calculation method for the photodegradation power correction coefficient K will be described. FIG. 7 is a view that shows a photoelectric current I as a function of an incident light amount L. FIG. 7 shows a first photoelectric current of the first photodetection circuit LS1 as a function $Ia(L_1)$ of an incident light amount $L_1$ and shows a second photoelectric current of the second photodetection circuit LS2 as a function $Ib(L_1)$ of an incident light amount $L_1$. From these, an initial ratio, which is a ratio of the first photoelectric current $Ia(L_1)$ to the second photoelectric current $Ib(L_1)$ before degradation (initial state), may be obtained.

Because the photoelectric current I increases in proportion to the incident light amount L, when the initial sensitivity in the first photodetection circuit LS1 is $Xa_0\hat{}(a_0)$ and the initial sensitivity in the second photodetection circuit LS2 is $Xb_0\hat{}(b_0)$, the first photoelectric current Ia(L) in the first photodetection circuit LS1 and the second photoelectric current Ib(L) in the second photodetection circuit LS2 may be expressed as follows (where "^" denotes power, and a and b are respectively called power coefficients).

$$Ia(L)=Xa_0\hat{}(a_0)\cdot L$$

$$Ib(L)=Xb_0\hat{}(b_0)\cdot L$$

Thus, when a light amount $L_0$ enters as incident light, the amount of dimmed incident light in the second photodetection circuit LS2 is $L_0/n$. Thus, at the light amount $L_0$, the first photoelectric current $Ia(L_0)$ in the first photodetection circuit LS1 and the second photoelectric current $Ib(L_0/n)$ in the second photodetection circuit LS2 are expressed as follows.

$$Ia(L_0)=Xa_0\hat{}(a_0)\cdot L_0$$

$$Ib(L_0/n)=Xb_0\hat{}(b_0)\cdot(L_0/n)$$

Thus, the initial ratio is $Ia(L_0)/Ib(L_0/n)=n\cdot(Xa_0\hat{}(a_0)/Xb_0\hat{}(b_0))$. The initial ratio is not dependent on the light amount $L_0$ but is obtained as a function of the initial sensitivities $Xa_0\hat{}(a_0)$ and $Xb_0\hat{}(b_0)$ and n. Thus, a measurement ratio at a given incident light amount L may be set to the initial ratio.

Figure 8:
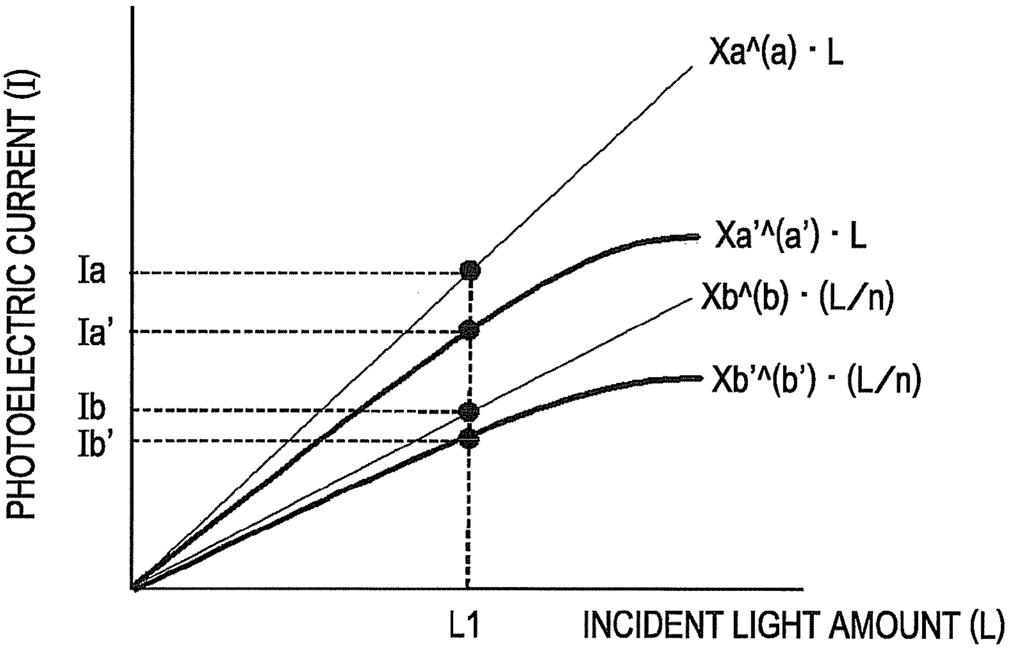
FIG. 8 is a view that shows a photoelectric current as a function of a degraded incident light amount.

Next, a degraded measurement ratio (first measurement ratio) is calculated. FIG. 8 is a view that shows a photoelectric current I as a function of a degraded incident light amount L. FIG. 8 shows initial first and second photoelectric currents as functions Ia(L) and Ib(L), a degraded first photoelectric current of the first photodetection circuit LS1 as a function Ia'(L), and a degraded second photoelectric current of the second photodetection circuit LS2 as a function Ib'(L).

The photosensor degrades due to photoexposure to decrease luminous sensitivity. Thus, a photoelectric current decreases as compared with that of the initial state. Such a decrease in luminous sensitivity may be obtained as a function R(p) (note that $R(p)<1$) of an accumulated light amount p, which is an accumulation of the amount of irradiated light from the initial state. That is, when the accumulated light amount in the first photodetection circuit LS1 after a certain period of time has elapsed is p, the accumulated light amount in the second photodetection circuit LS2 is p/n. Thus, when the sensitivity of the first photodetection circuit LS1 after photoexposure of the accumulated light amount p is Xa' and the sensitivity of the second photodetection circuit LS2 after photoexposure of the accumulated light amount p/n is Xb', Xa' and Xb' may be expressed as follows.

$$Xa'=R(p)\cdot Xa_0\hat{}(a)$$

$$Xb'=R(p/n)\cdot Xb_0\hat{}(b)$$

Note that the power coefficients a and b also vary due to photoexposure; the variations in power coefficients a and b may be obtained as a function Q(p) (note that $Q(p)<1$) of the accumulated light amount p, which is an accumulation of the amount of irradiated light from the initial state. Thus, when the modified power coefficient of the first photodetection circuit LS1 after receiving photoexposure of the accumulated light amount p is a' and the modified power coefficient of the second photodetection circuit LS2 after receiving photoexposure of the accumulated light amount p/n is b', a' and b' may be expressed as follows.

$$a'=Q(p)\cdot a_0$$

$$b'=Q(p/n)\cdot b_0$$

Thus, the first photoelectric current Ia'(L) of the degraded first photodetection circuit LS1 and the second photoelectric current Ib' (L) of the degraded second photodetection circuit LS2 may be expressed as follows.

$$Ia'(L)=Xa'\cdot L=R(p)\cdot Xa_0\hat{}(a')\cdot L=R(p)\cdot Xa_0\hat{}(Q(p)\cdot a_0)\cdot L$$

$$Ib'(L)=Xb'\cdot L=R(p)\cdot Xb_0\hat{}(b')\cdot L=R(p)\cdot Xb_0\hat{}(Q(p/n)\cdot b_0)\cdot L$$

On the other hand, because the first photodetection circuit LS1 has no light dimmer, such as the color filter 250, the accumulated light amount of the first photodetection circuit LS1 is larger than that of the second photodetection circuit LS2. Thus, the TFT 100, which is the photosensor, degrades early, and a reduction rate of the first photoelectric current Ia' (L) is larger.

Thus, when a certain light amount $L_1$ enters as incident light, the amount of dimmed incident light in the second photodetection circuit LS2 is $L_1/n$. Thus, at the light amount $L_1$, the first photoelectric current $Ia'(L_1)$ of the first photodetection circuit LS1 and the second photoelectric current $Ib'(L_1/n)$ of the second photodetection circuit LS2 are expressed as follows.

$$Ia'(L_1)=Xa'\cdot L_1=R(p)\cdot Xa_0\hat{}(a')\cdot L_1=R(p)\cdot Xa_0\hat{}(Q(p)\cdot a_0)\cdot L_1$$

$$Ib'(L_1/n)=Xb'\cdot(L_1/n)=R(p/n)\cdot Xb_0\hat{}(b')\cdot(L_1/n)=R(p/n)\cdot Xb_0\hat{}(Q(p/n)\cdot b_0)\cdot L_1/n)$$

Thus, the degraded first measurement ratio is expressed as follows.

$$Ia'(L_1)/Ib'(L_1/n)=n\cdot(R(p)/R(p/n))\cdot(Xa_0\hat{}(Q(p)\cdot a_0)/(Xb_0\hat{}(Q(p/n)\cdot b_0)) \quad \text{[Expression 1]}$$

Because the degraded first measurement ratio is not dependent on the incident light amount $L_1$, it is possible to obtain the same measurement ratio even when obtained by a given incident light amount L.

From the thus obtained degraded first measurement ratio and the initial ratio, the photodegradation power correction coefficient K is obtained as follows.

$$\begin{aligned} K &= (Ia'(L_1)/Ib'(L_1/n))/(Ia(L_0)/Ib(L_0/n)) \quad \text{[Expression 2]} \\ &= \frac{n\cdot(R(p)/R(p/n))\cdot(Xa_0\hat{}(Q(p)\cdot a_0)/(Xb_0\hat{}(Q(p/n)\cdot b_0))}{n\cdot(Xa_0\hat{}(a_0)/Xb_0(b_0))} \\ &= \frac{R(p)}{R(p/n)}\cdot\frac{Xb_0\hat{}(b_0)}{(Xb_0\hat{}(Q(p/n)\cdot b_0)}\cdot\frac{(Xa_0\hat{}(Q(p)\cdot a_0)}{Xa_0\hat{}(a_0)} \end{aligned}$$

Thus, the photodegradation power correction coefficient K is derived as a function of the accumulated light amount p. Note that the initial ration $Ia(L_0)/Ib(L_0/n)=n\cdot(Xa_0\hat{}(a_0)/Xb_0\hat{}(b_0))$ needs to be recorded beforehand in a data storage unit, such as a memory.

Figure 9:
FIG. 9 is a view that shows the relationship between a photodegradation power correction coefficient and an accumulated illuminance.
Figure 10:
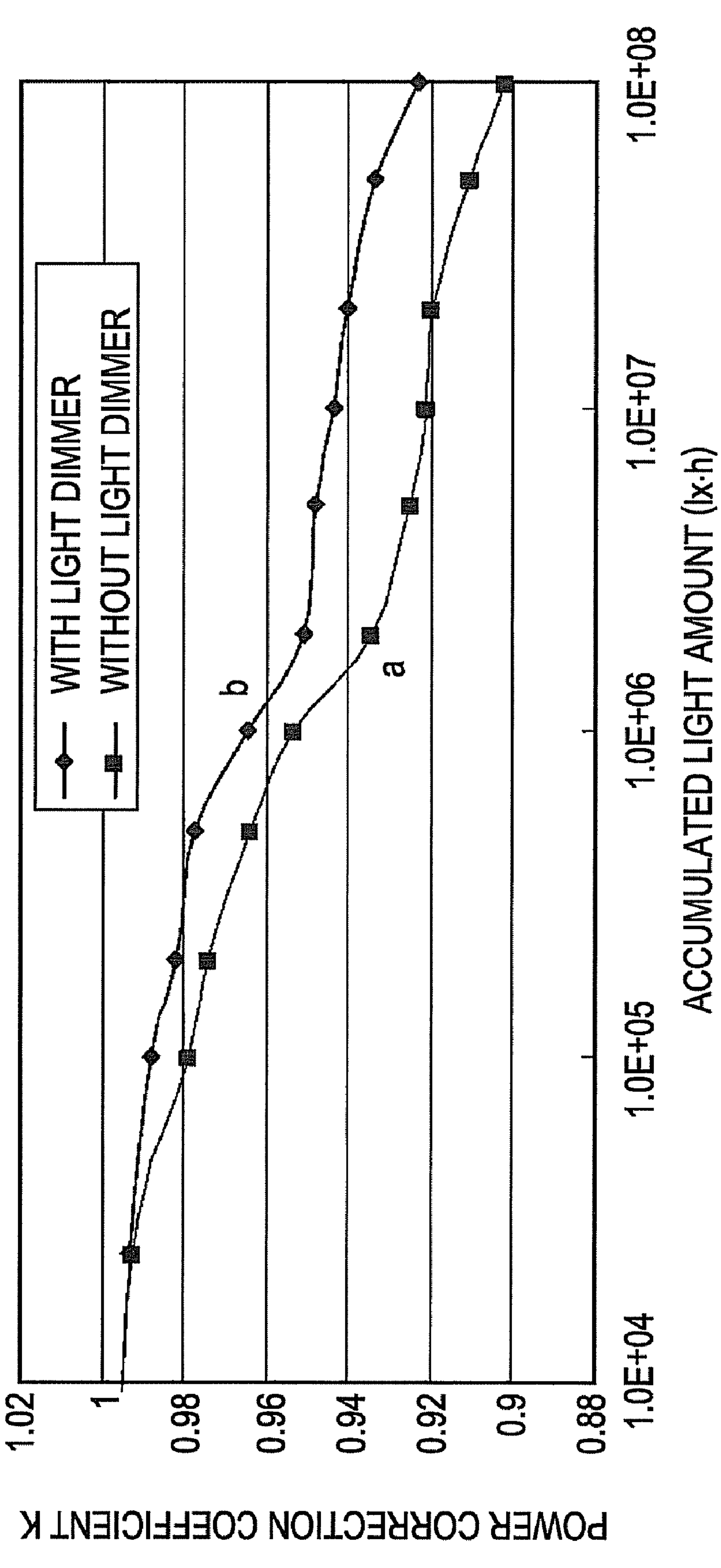
FIG. 10 is a view that shows the relationship between power coefficients and an accumulated illuminance.

The photodegradation power correction coefficient K varies as shown in FIG. 9 in accordance with the accumulated illuminance. Note that FIG. 9 is a view in which the photodegradation power correction coefficient K in regard to the light amount detecting device 1 of the display device 1000 of the aspects of the invention and the measured data of the accumulated light amounts are plotted. The relationship of FIG. 9 is obtained empirically beforehand. Then, when the relationship between the photodegradation power correction coefficient K and the accumulated illuminance is stored in a look-up table, the accumulated illuminance may be obtained on the basis of the photodegradation power correction coefficient K input from the photodegradation coefficient calculation unit 21. In addition, the power coefficient a of the first photodetection circuit LS1 and the power coefficient b of the second photodetection circuit LS2 vary as shown in FIG. 10 in accordance with the accumulated illuminance. Note that FIG. 10 is a view in which the accumulated light amount and the measured data of the power coefficients a and b are plotted. The relationship of FIG. 10 is obtained empirically beforehand. Thus, when the relationship between the accumulated illuminance and the power coefficients a and b is stored in a look-up table, the power coefficients a and b are obtained from the accumulated illuminance. As a result, the modified power coefficients a' and b' are obtained from the photodegradation power correction coefficient K, which is an output from the photodegradation coefficient calculation unit 21. Then, it is possible to correct the sensitivity in regard to the photosensor with a light dimmer and the photosensor without a light dimmer from the modified power coefficients a' and b'.

Here, when the power-corrected first and second photoelectric currents are Ia"($L_1$) and Ib"($L_1$), Ia"($L_1$) and Ib"($L_1$) may be expressed as follows.

$$Ia''(L_1)=Xa'^{\wedge}(a')\cdot L_1$$

$$Ib''(L_1)=Xb'^{\wedge}(b')\cdot L_1$$

In addition, the second measurement ratio, which is a ratio of the power-corrected first output signal to the power-corrected second output signal is Ia"($L_1$)/Ib"($L_1$/n). Furthermore, when the photodegradation slope correction coefficient with respect to the power-corrected photoelectric current ratio is K", the photodegradation slope correction coefficient K" is expressed as a ratio of the second measurement ratio to the initial ratio, that is, K"=(Ia"($L_1$)/Ib"($L_1$/n))/(Ia($L_0$)/Ib($L_0$/n)).

Here, when the modified proportional coefficient of the output value of the target photosensor (here, the photosensor with a light dimmer) to the initial value is D, D=Ib"($L_1$)/Ib. Thus, when the relationship between a photodegradation slope correction coefficient K" and an initial proportional coefficient correction amount measured beforehand is stored in a look-up table, the modified proportional coefficient D is obtained from the photodegradation slope correction coefficient K", so the power-corrected second photoelectric current Ib"($L_1$) may be corrected to the initial state before degradation using Ib=Ib"($L_1$)/D. Through the above described steps, it is possible to correct the power-corrected second photoelectric current Ib"($L_1$) into the initial second photoelectric current Ib and then output the initial second photoelectric current Ib.

Next, the operation when such correction of the photoelectric current is performed in the light amount detecting device 1 of the display device 1000 according to the aspects of the invention will be described.

Figure 11:
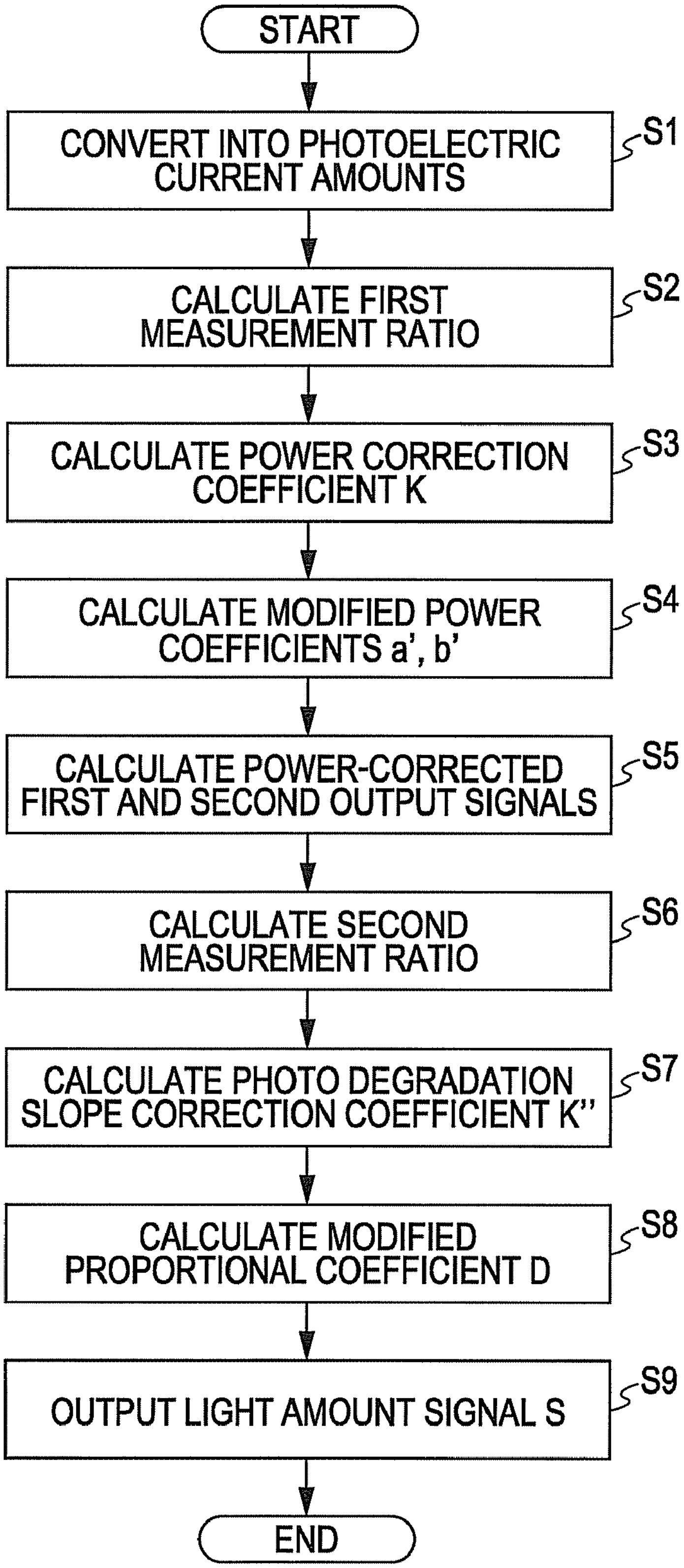
FIG. 11 is a view that shows a flowchart in association with correction of a photoelectric current.

FIG. 11 is a view that shows a flowchart in association with correction of a photoelectric current. FIG. 11 shows step S1 in which first and second output signals, which are voltage outputs, are converted into photoelectric current amounts; step S2 in which a first measurement ratio, which is a ratio of the converted first and second photoelectric current amounts, is calculated; step S3 in which a power correction coefficient K, which is a ratio of the first measurement ratio to an initial ratio, is calculated; step S4 in which modified power coefficients a' and b' are calculated; step S5 in which power-corrected first and second output signals are calculated; step S6 in which a second measurement ratio, which is a ratio of the power-corrected first output signal to the power-corrected second output signal, is calculated; step S7 in which a photodegradation slope correction coefficient K", which is a ratio of the second measurement ratio to the initial ratio, is calculated; step S8 in which a modified proportional coefficient D is calculated from the photodegradation slope correction coefficient K"; and step S9 in which a photoelectric current derived through calculation is output as a light amount signal S of incident light.

First, in the photodetection unit 10, the capacitors 110 and 210 are charged to a potential Vs. Then, incident light of the light amount $L_1$ irradiated to the TFT 100, and dimmed incident light of the light amount $L_1$/n is irradiated to the TFT 200. Thus, photoelectric currents (leakage currents) are generated in the TFTs 100 and 200. Then, the potentials of the capacitors 110 and 210 decrease. The photodetection unit 10 outputs the potentials of the capacitors 110 and 210 at that time as a first output signal Sa and a second output signal Sb.

Then, in the photodegradation coefficient calculation unit 21, initial power coefficients a and b are read from the memory circuit 23, the potential signals of the first output signal Sa and second output signal Sb, output from the photodetection unit 10, are read as photoelectric currents in the TFTs 100 and 200. The potentials charged in the capacitors 110 and 210 are equivalent to potential differences between the source portions 101 and 201 and the drain portions 102 and 202 in the TFTs 100 and 200, respectively. As the amount of incident light increases, the photoelectric current increases. Thus, the potentials of the capacitors 110 and 210 decrease by a large amount. In contrast, as the amount of incident light reduces, the photoelectric current reduces. Thus, the potentials of the capacitors 110 and 210 decrease by a small amount. Thus, by acquiring the potential signals after a predetermined period of time has elapsed from initiation of irradiation of incident light, it is possible to read as signals of the photoelectric currents. That is, as the potentials of the capacitors 110 and 210, which are potential signals, decrease, the photoelectric currents increase, while as the potentials of the capacitors 110 and 210 increase, the photoelectric currents reduce. In the photodegradation coefficient calculation unit 21, the potential signal is associated with the photoelectric current, and a signal of a degraded first photoelectric current Ia($L_1$) and a signal of a degraded second photoelectric current Ib($L_1$/n) are acquired from the potential signals.

Then, in step S2, from the thus acquired degraded first photoelectric current Ia($L_1$) and second photoelectric current Ib($L_1$/n), the first measurement ratio (Ia($L_1$)/Ib($L_1$/n)) is calculated.

Then, in step S3, the initial ratio (Ia($L_0$)/Ib($L_0$/n)), which is stored beforehand in the memory circuit 23, is read to the photodegradation coefficient calculation unit 21, and the photodegradation power correction coefficient K (=(Ia($L_1$)/Ib($L_1$/n))/(Ia($L_0$)/Ib($L_0$/n))) is calculated as a ratio of the first measurement ratio to the initial ratio. At this time, the above described initial first photoelectric current Ia($L_0$) and the initial second photoelectric current Ib($L_0$/n) may be stored beforehand in the memory circuit 23 in place of the initial ratio, and in step S2, the initial ratio may be calculated.

After that, the process proceeds to step S4. In step S4, the photodegradation power correction coefficient K calculated in step S3 is output to the photodegradation rate calculation unit 22. Then, in the photodegradation rate calculation unit 22, first, the power coefficient correction amount stored in the memory circuit 23 is called, and the look-up table that associates the photodegradation power correction coefficient K with the power coefficient correction amount is referred to. By so doing, the modified power coefficients a' and b' corresponding to the photodegradation power correction coefficient K are acquired.

Here, the look-up table will be described. FIG. 9 is a view in which the photodegradation power correction coefficient K in regard to the light amount detecting device 1 of the display device 1000 of the aspects of the invention and the measured data of the accumulated light amounts are plotted. FIG. 10 is a view in which the accumulated light amount and the measured data of the power coefficients a and b are plotted. Thus, the accumulated light amount (illuminance×time) irradiated to the photosensor is obtained from the value of the photodegradation power correction coefficient K shown in FIG. 9. In addition, it is possible to correct a power coefficient for a photosensor with a light dimmer and a power coefficient for a photosensor without a light dimmer from FIG. 10. As the degradation proceeds, the photodegradation power correction coefficient K and the power coefficients all decrease.

Then, the function curve shown in FIG. 9 shows the accumulated light amount as a function of the photodegradation power correction coefficient K as a variable based on the measured data. In addition, the function curve shown in FIG. 10 shows the power coefficient a or b as a function of the accumulated light amount as a variable. As long as a circuit that implements the above functions may be configured in the photodegradation rate calculation unit 22, it is possible to calculate the power coefficients a and b in association with a photodegradation power correction coefficient K. However, if such an irregular function is intended to be implemented by a circuit configuration, the circuit configuration becomes complex. Then, in the present embodiment, the look-up table that associates the photodegradation power correction coefficient K with the power coefficient correction amount based on the two function curves shown in FIG. 9 and FIG. 10 is created, and stored in the memory circuit 23. By so doing, it is not necessary to provide a complex circuit that is necessary to calculate the modified power coefficients a' and b', so it is possible to reduce the circuit size.

When the data size of the look-up table stored in the memory circuit 23 needs to be reduced, for example, it is only necessary that the values of the photodegradation power correction coefficient K are stored in units of 0.02 as the look-up table. Then, when the value of the photodegradation power correction coefficient K is not included in the look-up table, interpolation calculation is performed using adjacent data. Thus, even when the value is not included in the look-up table, it is possible to derive the modified power coefficient a' or b' from the photodegradation power correction coefficient K. For example, two points corresponding to the two photodegradation power correction coefficients K that place a certain photodegradation power correction coefficient K in between are selected from the look-up table, and these points are connected with a straight line. Thus, the power coefficients a and b corresponding to the photodegradation power correction coefficient K that is not included in the look-up table is determined. Specifically, when the photodegradation power correction coefficient K is 0.03, the modified power coefficient a' or b' may be derived from the average of power coefficients a' or b' corresponding to the photodegradation power correction coefficients K of 0.02 and 0.04.

Referring back to the description of FIG. 11, in step S5, in the photodegradation rate calculation unit 22, the first and second output signals are converted into the power-corrected first and second output signals on the basis of the modified power coefficients a' and b'. In step S6, the second measurement ratio, which is a ratio of the first and second output signals, is calculated. In step S7, the photodegradation slope correction coefficient K", which is a ratio of the second measurement ratio to the initial ratio read from the memory circuit 23, is calculated. Furthermore, in step S8, in the optical signal output unit 24, the modified proportional coefficient D is calculated on the basis of the look-up table that associates the photodegradation slope correction coefficient K" with the proportional coefficient correction amount. Then, in step S9, the power-corrected second photoelectric current Ib"($L_1$/n) is corrected to calculate the initial second photoelectric current Ib($L_1$/n). Then, in step S9, the initial second photoelectric current Ib($L_1$/n) is output as the light amount signal S of incident light.

According to the display device that includes the thus configured light amount detecting device 1, the following advantageous effects may be obtained. That is, the light amount detecting device has the function of correcting the sensitivity so that the degraded second photoelectric current Ib'($L_1$) is corrected on the basis of the photodegradation power correction coefficient K and the modified power coefficient a' or b' to obtain the initial second photoelectric current Ib($L_1$). Thus, even when degradation due to photoexposure occurs, the light amount detecting device outputs an accurate light amount signal S. In addition, the photodetection unit 10 does not use a photoelectric conversion element that improves the antidegradation property, so it is possible to manufacture both the photosensor and the driving transistor of the display device in the same process. Thus, it is possible to manufacture the photosensor in a simple process and, therefore, manufacturing cost may be reduced.

In addition, by storing the initial power coefficient correction amount and the initial proportional coefficient correction amount that are necessary for creating the look-up table in the memory circuit 23, a complex circuit configuration in association with calculation of the modified power coefficient a' or b' is not necessary. Thus, power consumption is suppressed, the area of the circuit is reduced, and, as a result, manufacturing cost may be suppressed.

In addition, when the calculated photodegradation power correction coefficient K is not included in the look-up table, by performing interpolation calculation using the power coefficients a or b corresponding to the two photodegradation power correction coefficients K that place the intended photodegradation power correction coefficient K in between, it is possible to derive the modified power coefficient a' or b'. Thus, the look-up table is reduced to suppress the data size.

Figure 12:
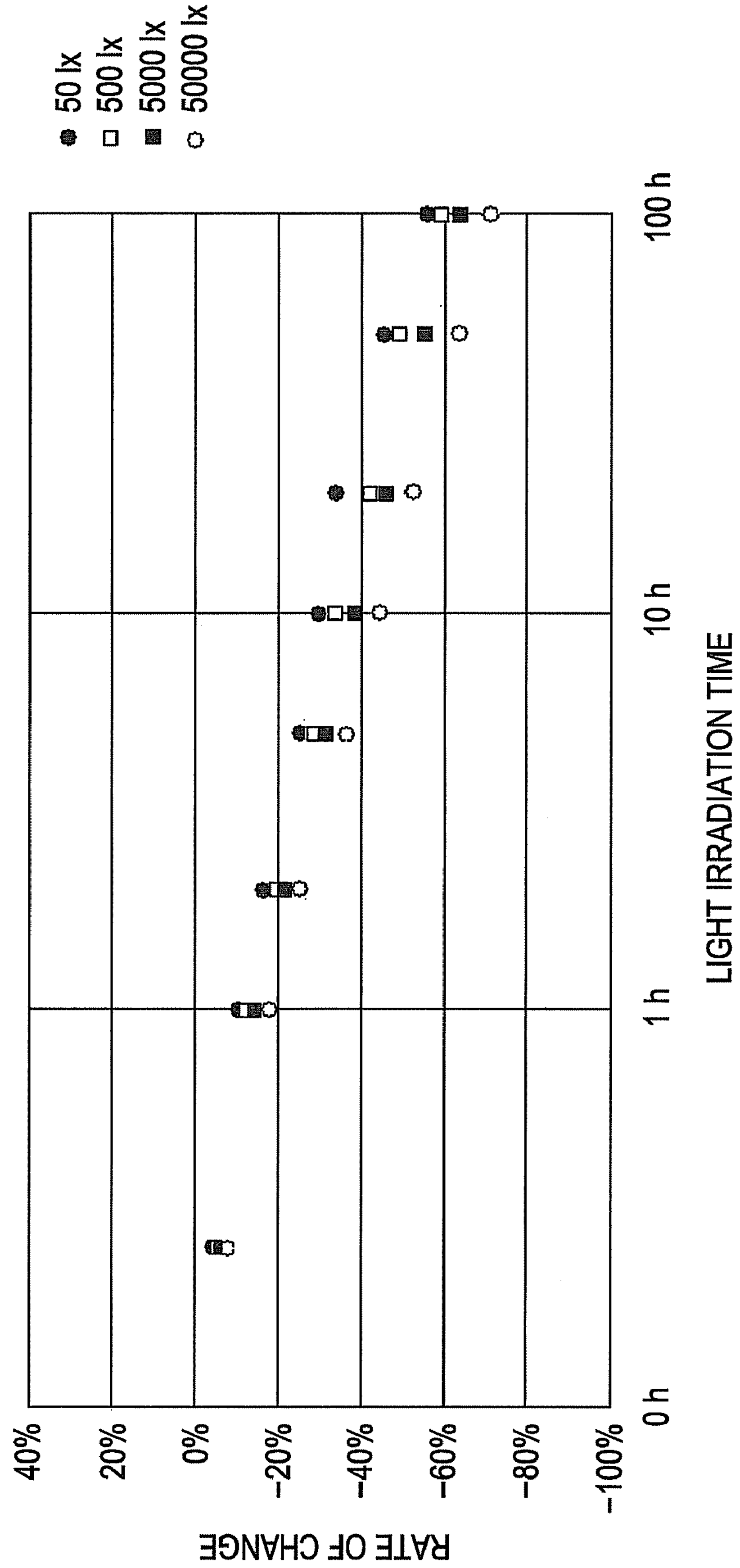
FIG. 12 is a view that shows light irradiation time and variations in rate of change of sensor output when degradation is not corrected.
Figure 13:
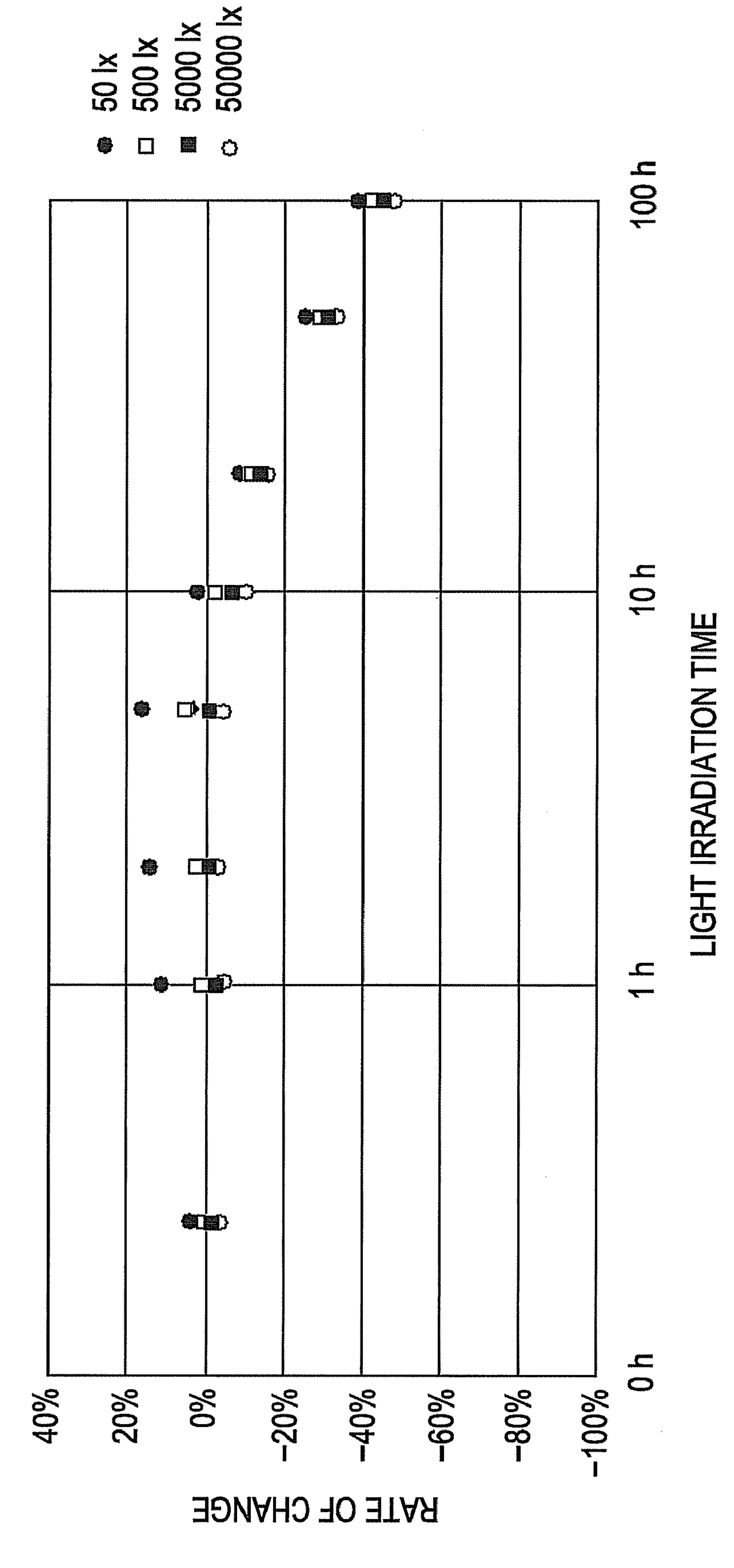
FIG. 13 is a view that shows light irradiation time and variations in rate of change of sensor output when degradation is corrected in accordance with the aspects of the invention.

FIG. 12 is a view that shows light irradiation time and variations in rate of change of sensor output when degradation is not corrected. FIG. 13 is a view that shows light irradiation time and variations in rate of change of sensor output when degradation is corrected in accordance with the aspects of the invention. When FIG. 12 and FIG. 13 are compared, it appears that, when degradation correction is performed in accordance with the present embodiment, degradation correction is performed in a wide range of light amounts.

In the present embodiment, the initial second photoelectric current Ib($L_1$) of the second photodetection circuit LS2 is calculated as the light amount signal S. Instead, the initial first photoelectric current Ia($L_1$) of the first photodetection circuit LS1 may be obtained as the light amount signal S.

Measurement of the incident light amount L in the light amount detecting device 1 of the present embodiment may be continuously performed at predetermined intervals. Then, when the following measurement is performed, by applying a potential Vg to the gate terminal 190, the TFTs 100 and 200 are turned on to discharge the potentials of the capacitors 110 and 210. Then, an electric potential Vs is charged again to the capacitors 110 and 210 to perform measurement.

The light amount detecting device 1 is connected to the backlight (not shown), and outputs the light amount signal of external ambient light, measured by the light amount detecting device 1, to the backlight. In the backlight, the amount of light emission is adjusted on the basis of the light amount signal from the light amount detecting device 1. Specifically, when ambient light is bright like natural light during the daytime, it is set to increase the amount of light emission of the backlight. On the other hand, when used in a dark environment like during the night, it is set to reduce the amount of light emission of the backlight. Thus, it is possible to perform image display with the amount of light emission appropriate in accordance with an environment used.

Note that here, the liquid crystal display device is described; the display area may be applied to a display device, such as an organic EL device, a twisting ball display panel that uses a twisting ball painted into different colors for respective areas having different polarities as an electrooptic material, a toner display panel that uses a black toner as an electrooptic material, or a plasma display panel that uses high-pressure gas such as helium or neon as an electrooptic material.

Second Embodiment

Next, a second embodiment will be described. In the second embodiment, potential signals output from the photodetection unit 10 to the photosensor reader unit 20 are read as photoelectric currents, and the photoelectric currents are logarithmically transformed and then calculated.

First, a calculation method through logarithmical transformation will be described. When the photodegradation power correction coefficient K in the first embodiment is logarithmically transformed, $Log_2K=Log_2\{(Ia'(L_1)/Ib'(L_1/n))/(Ia(L_0)/Ib(L_0/n))\}=(Log_2(Ia'(L_1))-Log_2(Ib'(L_1/n)))-(Log_2(Ia(L_0))-Log_2(Ib(L_0/n)))$. Then, when the photodegradation slope correction coefficient K" is logarithmically transformed, $Log_2K''=Log_2(Ia''(L_1)/Ib''(L_1))/(Ia(L_1)/Ib(L_1))=Log_2(Ia''(L_1))-Log_2(Ib''(L_1))-(Log_2(Ia(L_1))-Log_2(Ib(L_1)))$. Thus, through logarithmical transformation, multiplication and division are replaced with addition and subtraction.

By so doing, from the logarithmically transformed power correction coefficient $Log_2K$ and the logarithmically transformed photodegradation power correction coefficient $Log_2K''$, the initial logarithmically transformed photoelectric current $Log_2(Ib(L_1))$ is calculated by $Log_2(Ib(L_1))=Log_2(Ib''(L_1))-Log_2D$. Then, the logarithmically transformed photoelectric current $Log_2(Ib(L_1))$ is inverse-logarithmically transformed, and the initial second photoelectric current $Ib(L_1)=Ib''(L_1)/D$ is calculated. The thus obtained initial second photoelectric current Ib is output as the light amount signal S of incident light.

Figure 14:
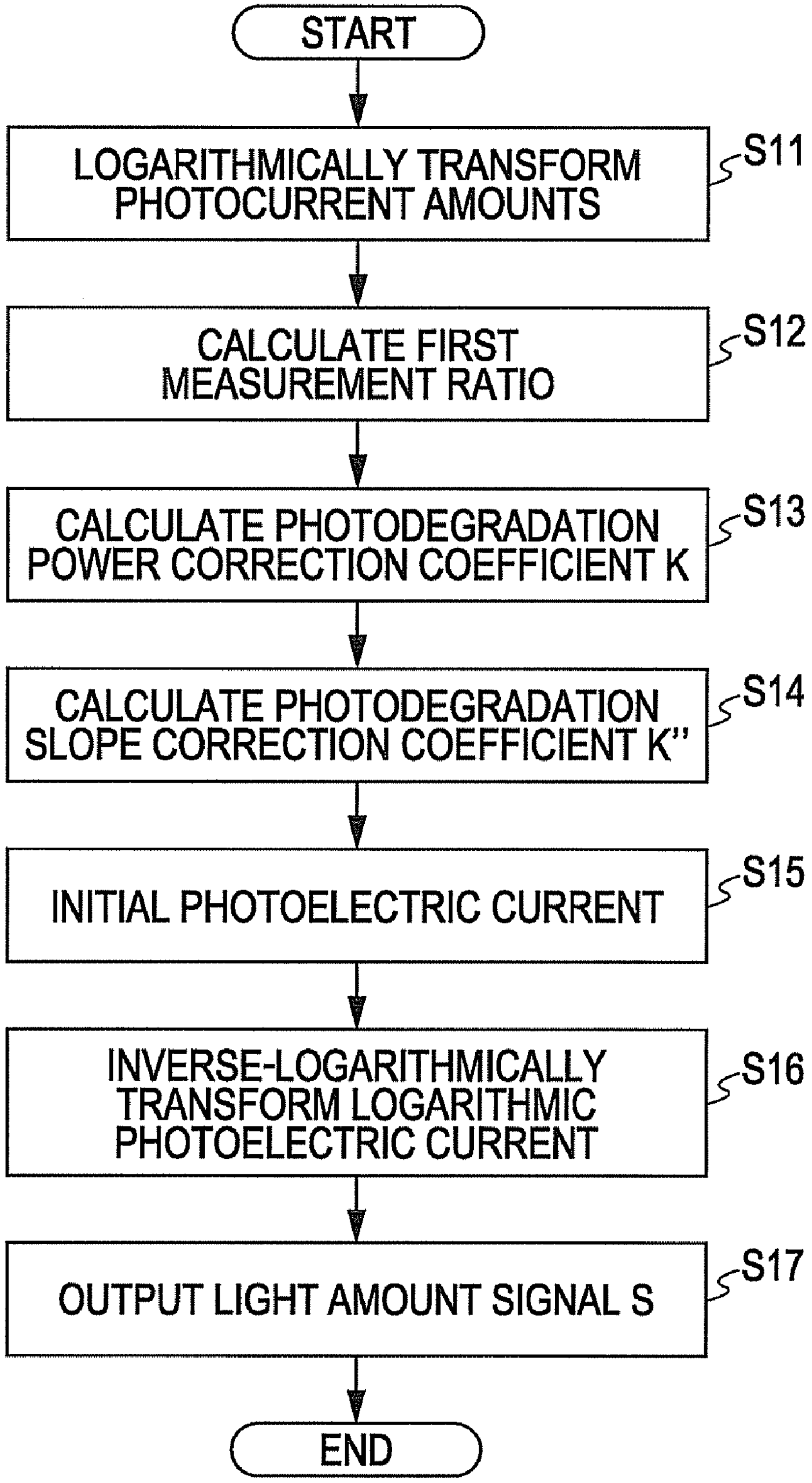
FIG. 14 is a view that shows a flowchart in association with correction of a photoelectric current according to a second embodiment.

Next, the operation of the light amount detecting device 1 of the display device 1000 according to the second embodiment will be described. FIG. 14 is a view that shows a flowchart in association with correction of a photoelectric current according to the second embodiment. FIG. 14 shows step S11 in which a first output signal Sa and second output signal Sb output from the photodetection unit 10 are read as a degraded first photoelectric current $Ia'(L_1)$ and second photoelectric current $Ib'(L_1)$, and are then logarithmically transformed; step S12 in which a logarithmically transformed first measurement ratio is calculated; step S13 in which the logarithmically transformed initial ratio is read from the memory circuit 23 and a logarithmically transformed power correction coefficient $Log_2K$ is calculated; step S14 in which modified logarithmically transformed power coefficients $Log_2a'$ and $Log_2b'$ corresponding to the calculated logarithmically transformed power correction coefficient $Log_2K$ are acquired from the look-up table, and a logarithmically transformed photodegradation slope correction coefficient $Log_2K''$ is calculated from the modified power coefficients $Log_2a'$ and $Log_2b'$; step S15 in which the logarithmically transformed initial photoelectric current $Log_2(Ib(L_1))$ is calculated; step S16 in which the logarithmically transformed initial photoelectric current $Log_2(Ib)$ is inverse-logarithmically transformed; and step S17 in which the inverse-logarithmically transformed second photoelectric current Ib is output as a light amount signal S.

The memory circuit 23 according to the second embodiment stores the logarithmically transformed initial power coefficients $Log_2a$ and $Log_2b$, the logarithmically transformed initial ratio $Log_2(Ia(L_0))-Log_2(Ib(L_0/n))$, the logarithmically transformed power coefficient correction amount and the proportional coefficient correction amount.

First, in step S11, in the photodegradation coefficient calculation unit 21, a degraded first photoelectric current $Ia'(L_1)$ and a degraded second photoelectric current $Ib'(L_1/n)$ at a certain incident light amount $L_1$ are acquired from the first output signal Sa and the second output signal Sb output from the photodetection unit 10, and these first photoelectric current $Ia'(L_1)$ and second photoelectric current $Ib'(L_1/n)$ are logarithmically transformed to calculate $Log_2(Ia'(L_1))$ and $Log_2(Ib'(L_1/n))$.

Then, in step S12, in the photodegradation coefficient calculation unit 21, a logarithmically transformed first measurement ratio $Log_2(Ia'(L_1))-_{Log2}(Ib'(L_1/n))$ is calculated.

After that in step S13, in the photodegradation coefficient calculation unit 21, the logarithmically transformed initial ratio $Log_2(Ia(L_0))-Log_2(Ib(L_0/n))$ is read from the memory circuit 23, and a logarithmically transformed photodegradation power correction coefficient $Log_2K=Log_2(Ia'(L_1))-Log_2(Ib'(L_1/n))-((Log_2(Ia(L_0))-Log_2(Ib(L_0/n)))$ is calculated.

In step S14, the logarithmically transformed photodegradation power correction coefficient $Log_2K$ calculated in step S13 is output from the photodegradation coefficient calculation unit 21 to the photodegradation rate calculation unit 22. Then, in the photodegradation rate calculation unit 22, using the look-up table that associates the logarithmically transformed photodegradation power correction coefficient $Log_2K$ output from the photodegradation coefficient calculation unit 21 with the logarithmically transformed initial power coefficient correction amount supplied from the memory circuit 23, modified logarithmically transformed power coefficients $Log_2a'$ and $Log_2b'$ are obtained. On the basis of these modified logarithmically transformed power coefficients $Log_2a'$ and $Log_2b'$, logarithmically transformed power-corrected photoelectric currents $Ia''(L_1)$ and $Ib''(L_1)$ are calculated. Then, a logarithmically transformed photodegradation slope correction coefficient $log_2K''=Log_2(Ia''(L_1))-Log_2(Ib''(L_1))-(Log_2(Ia(L_1))-Log_2(Ib(L_1)))$ is calculated.

In step S15, in the optical signal output unit 24, using the look-up table that associates the logarithmically transformed photodegradation slope correction coefficient $Log_2K''$ with the logarithmically transformed initial proportional coefficient correction amount supplied from the memory circuit 23, a modified logarithmically transformed proportional coefficient $log_2D$ is calculated. Then, the logarithmically transformed modified proportional coefficient $\log_2 D=\log_2(Ib''(L_1))-\log_2(Ib(L_1))$ of the second photoelectric current is calculated. After that, a logarithmically transformed initial second photoelectric current $Log_2(Ib(L_1))=Log_2(Ib''(L_1))-Log_2 D$ is calculated.

Subsequently, in step S16, in the optical signal output unit 24, the logarithmically transformed initial second photoelectric current $Log_2(Ib(L_1))$ is inverse-logarithmically transformed to calculate an initial second photoelectric current $Ib(L_1)$.

Then, in step S17, the initial second photoelectric current $Ib(L_1)$ calculated in step S16 is output as a light amount signal S of the incident light amount $L_1$ of incident light.

According to the second embodiment, the following advantageous effects may be obtained. Through calculation of logarithmic transformation, multiplication and division are replaced with addition and subtraction, so it is possible to reduce the circuit configuration. Thus, the area of the circuit is reduced, and, as a result, manufacturing cost may be reduced. Hence, power consumption is suppressed.

As described in the first embodiment, the first output signal Sa and the second output signal Sb input to the photosensor reader unit 20 are read as time required to decrease the potentials of the capacitors 110 and 210 from Vs to Vc and then logarithmically transformed, thus making it possible to calculate and output the light amount signal S.

In the present embodiment as well, measurement of the incident light amount L in the light amount detecting device 1 is performed at predetermined intervals. Then, when the following measurement is performed, by applying a potential Vg to the gate terminal 190, the TFTs 100 and 200 are turned on to discharge the potentials of the capacitors 110 and 210. Then, an electric potential Vs is charged again to the capacitors 110 and 210 to perform measurement.

The entire disclosure of Japanese Patent Application No. 2008-070789, filed Mar. 19, 2008 is expressly incorporated by reference herein.

What is claimed is:

1. A display device comprising:

a substrate;

a display area provided on the substrate and includes a switching element in correspondence with each pixel;

a photodetection unit having first and second photosensors;

a photosensor reader unit;

a light amount detecting device that outputs the amount of light detected by the photodetection unit as a light amount signal;

a first photodetection circuit that outputs a first output signal based on incident light that enters the first photosensor to the photosensor reader unit; and a second photodetection circuit that outputs a second output signal to the photosensor reader unit based on dimmed incident light, which is dimmed through a light dimming unit as compared with the light that enters the first photosensor and which enters the second photosensor, wherein the photosensor reader unit includes a photodegradation coefficient calculation unit that calculates a first measurement ratio, which is a ratio of the first output signal to the second output signal, and then calculates a photodegradation power correction coefficient, which is a ratio of the first measurement ratio to an initial ratio that is an initial first measurement ratio measured beforehand;

a photodegradation rate calculation unit that derives modified power coefficients on the basis of the photodegradation power correction coefficient, calculates a second measurement ratio, which is a ratio of the power-corrected first and second output signals, using the modified power coefficients, and then calculates a photodegradation slope correction coefficient, which is a ratio of the second measurement ratio to the initial ratio; and an optical signal output unit that derives modified proportional coefficients on the basis of the photodegradation slope correction coefficient, corrects the power-corrected first and second output signals using the modified proportional coefficients so as to be initial light amount signals and then outputs the initial light amount signals.

2. The display device according to claim 1, wherein the photodegradation rate calculation unit includes a look-up table that associates the photodegradation power correction coefficient with an initial power coefficient correction amount measured beforehand, and calculates the modified power coefficients on the basis of the power coefficient correction amount.

3. The display device according to claim 2, wherein the photodegradation rate calculation unit, when the photodegradation power correction coefficient is not included in the look-up table, derives the modified power coefficients through interpolation calculation using the initial power coefficient correction amount measured beforehand in the look-up table.

4. The display device according to claim 1, wherein the optical signal output unit includes a look-up table that associates the photodegradation slope correction coefficient with an initial proportional coefficient correction amount measured beforehand, and calculates modified proportional coefficients on the basis of the proportional coefficient correction amount.

5. The display device according to claim 4, wherein the optical signal output unit, when the photodegradation slope correction coefficient is not included in the look-up table, derives the modified proportional coefficients through interpolation calculation using the initial proportional coefficient correction amount measured beforehand in the look-up table.

6. The display device according to claim 1, wherein the first and second photosensors are thin film transistors, and each include a capacitor that charges a voltage applied between both ends of the thin film transistor.

7. The display device according to claim 1, wherein the photodegradation coefficient calculation unit logarithmically transforms the first and second output signals to calculate the photodegradation power correction coefficient, the photodegradation rate calculation unit acquires logarithms of the modified power coefficients on the basis of the logarithmic photodegradation power correction coefficient and calculates a logarithm of the photodegradation slope correction coefficient, and the optical signal output unit derives logarithmic modified proportional coefficients on the basis of the logarithmic photodegradation slope correction coefficient, corrects the logarithmic first and second output signals to be logarithmic initial light amount signals using the logarithmic modified proportional coefficients, inverse-logarithmically transforms the corrected logarithmic initial light amount signals, and then outputs the initial light amount signals.

8. The display device according to claim 1, wherein the display area includes an electrooptic material layer.

* * * * *